(12) United States Patent
Fahlbusch et al.

(10) Patent No.: US 8,988,797 B2
(45) Date of Patent: Mar. 24, 2015

(54) MICROSCOPE OBJECTIVE WITH AT LEAST ONE LENS GROUP THAT CAN BE MOVED ALONG THE OPTICAL AXIS

(75) Inventors: Ingo Fahlbusch, Goettingen (DE); Georg Herbst, Goettingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 67 days.

(21) Appl. No.: 13/350,142

(22) Filed: Jan. 13, 2012

(65) Prior Publication Data

US 2012/0188660 A1 Jul. 26, 2012

(30) Foreign Application Priority Data

Jan. 18, 2011 (DE) .................. 10 2011 002 818
Nov. 5, 2011 (DE) .................. 10 2011 117 743

(51) Int. Cl.
*G02B 7/02* (2006.01)
*G02B 21/02* (2006.01)
*G02B 7/08* (2006.01)

(52) U.S. Cl.
CPC ............... *G02B 21/02* (2013.01); *G02B 7/022* (2013.01); *G02B 7/08* (2013.01)
USPC ........................................................ 359/824

(58) Field of Classification Search
USPC .................................................. 359/822–824
See application file for complete search history.

(56) References Cited

U.S. PATENT DOCUMENTS 5,631,776 A * 5/1997 Weigand et al. ............. 359/694
5,825,535 A * 10/1998 Biber et al. .................. 359/380
6,144,021 A 11/2000 Suzuki
6,292,221 B1 * 9/2001 Lichtman .................... 348/345
7,327,514 B2 2/2008 Uhl et al.
7,423,806 B2 9/2008 Uhl et al.
2003/0103263 A1 6/2003 Engelhardt et al.
2011/0082590 A1 4/2011 Fahlbusch et al.

FOREIGN PATENT DOCUMENTS

| DE | 290 267 A5 | 5/1991 |
| DE | 9 415 219 U1 | 1/1995 |
| DE | 195 41 237 A1 | 5/1996 |
| DE | 196 14 235 A1 | 10/1996 |
| DE | 101 60 587 A1 | 6/2003 |
| DE | 696 29 982 T2 | 7/2004 |
| DE | 103 09 138 A1 | 9/2004 |
| DE | 10 2008 026 774 A1 | 12/2009 |
| EP | 1 319 968 B1 | 8/2008 |
| WO | WO 2008/100695 A2 | 8/2008 |

* cited by examiner

*Primary Examiner* — James Jones
(74) *Attorney, Agent, or Firm* — Patterson Thuente Pedersen, P.A.

(57) ABSTRACT

The present disclosure relates to a family of microscopes, each with at least one lens group that includes at least one lens and a lens mount and moves along the optical axis via a drive system for The drive system includes a rotary motor and transmission elements to convert the rotary motion to linear motion to transmit the translational movement to the lens group, and, simultaneously, to prevent rotations of the lens group about the optical axis. In an embodiment, the rotating output shaft of the motor is connected with a screw spindle that engages with a threaded hole machined into the lens mount, so that the lens group is directly moved in a translational manner. The engagement of the screw spindle with the lens mount both effects the translational movement of the lens group and secures the lens group against rotation about the optical axis.

20 Claims, 25 Drawing Sheets

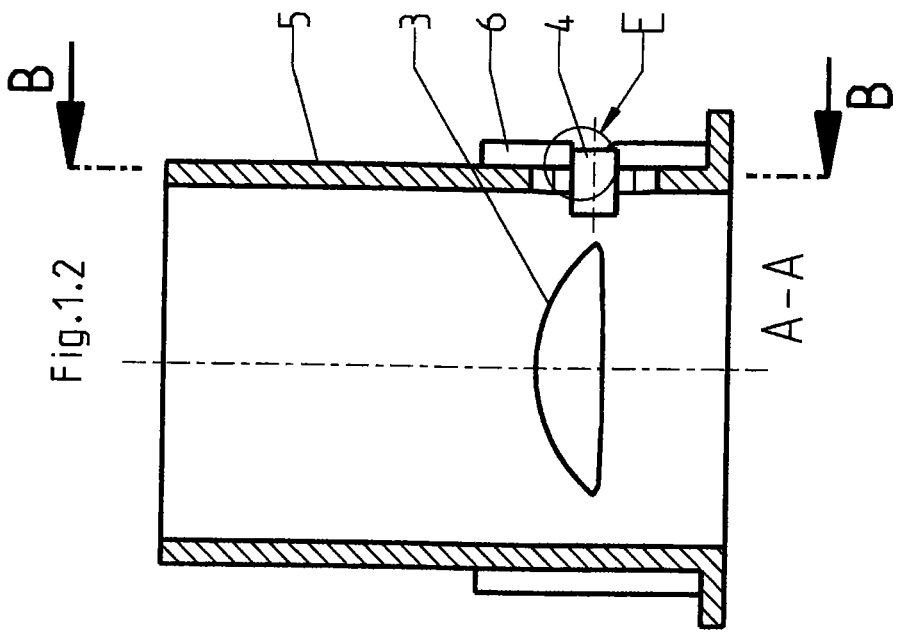
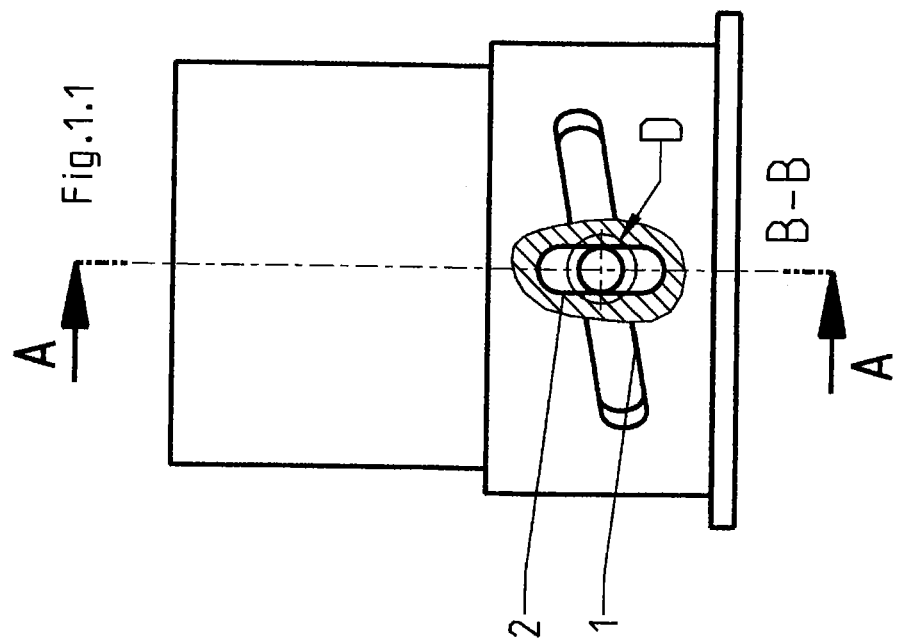

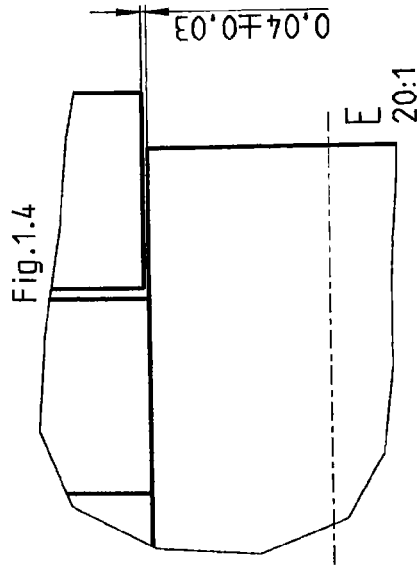
Fig.1.4 PRIOR ART
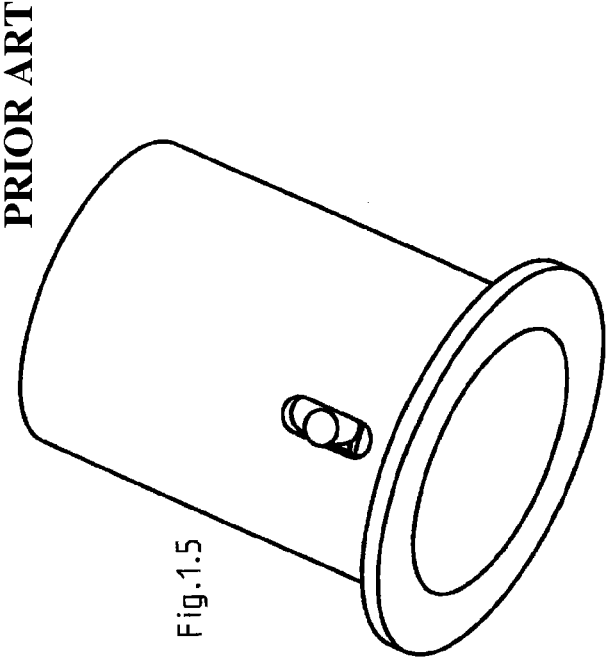
Fig.1.5 PRIOR ART
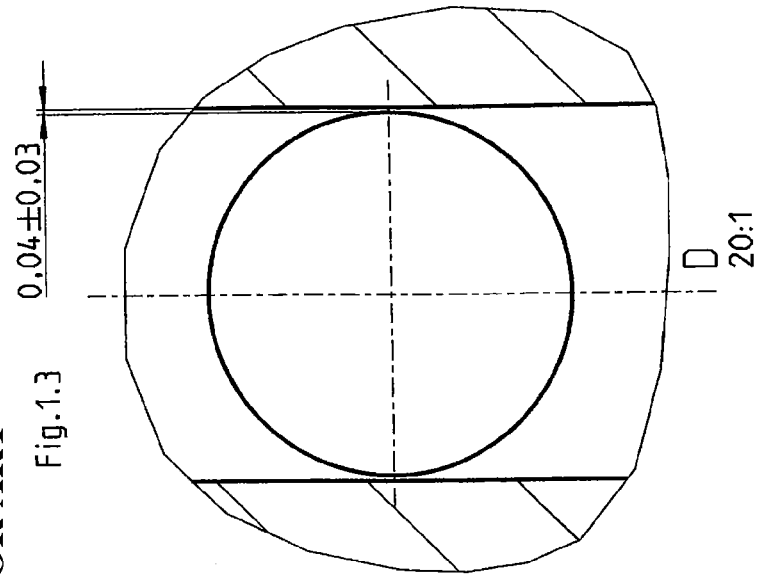
Fig.1.3 PRIOR ART

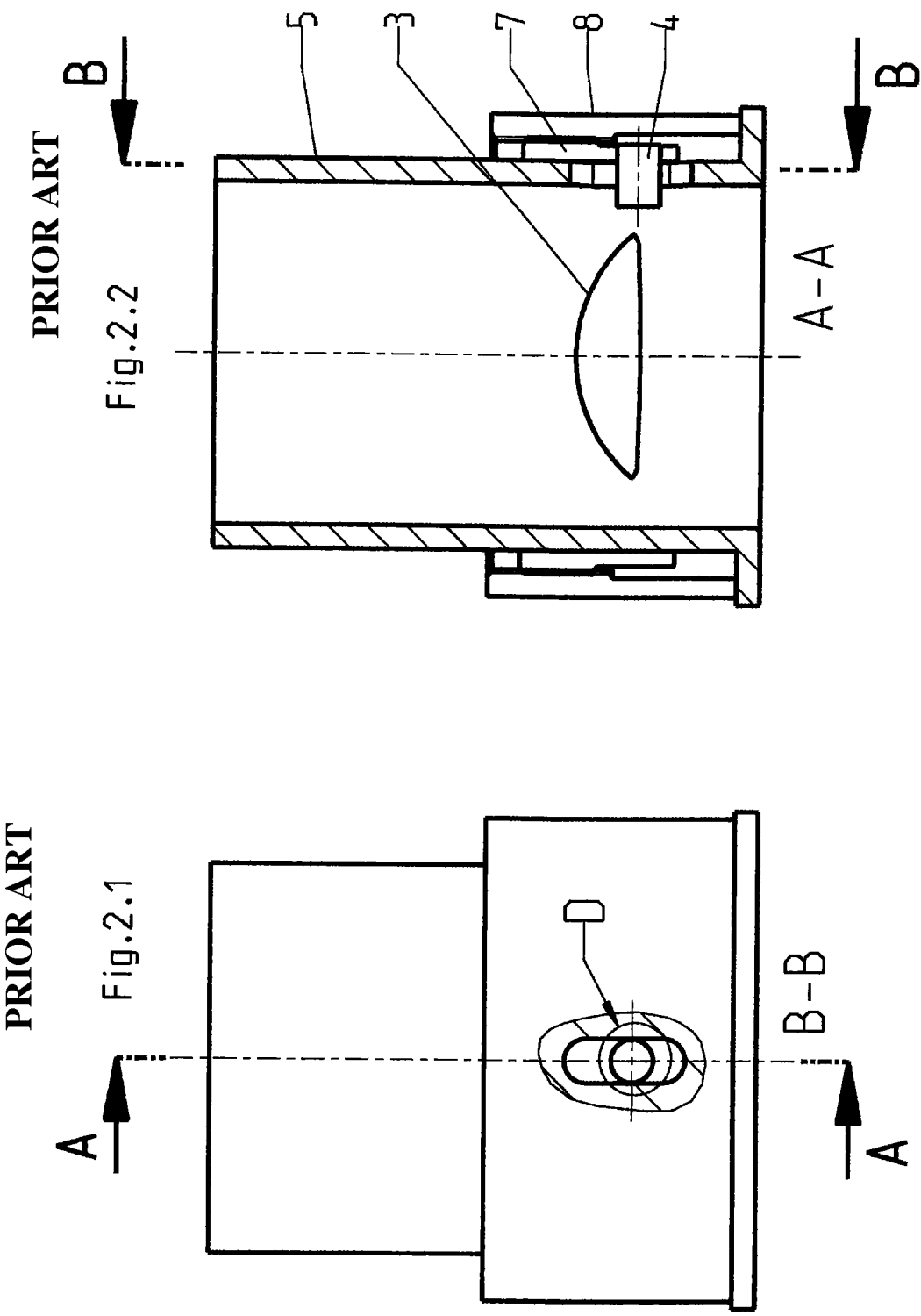

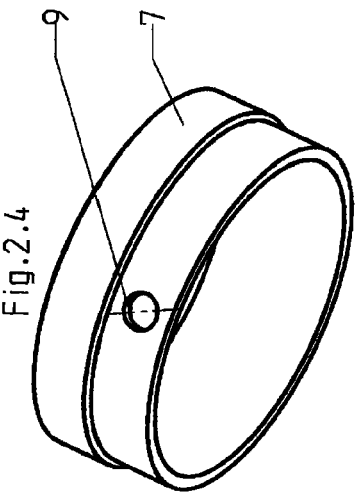
Fig.2.4 PRIOR ART
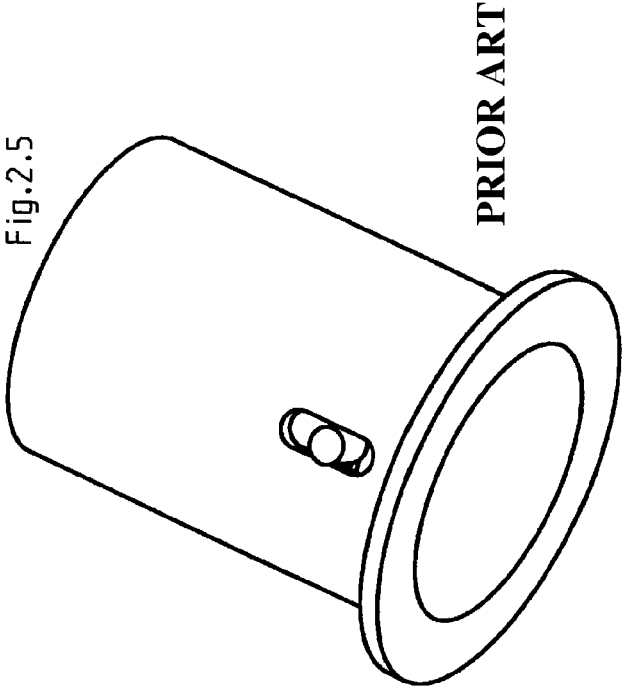
Fig.2.5 PRIOR ART
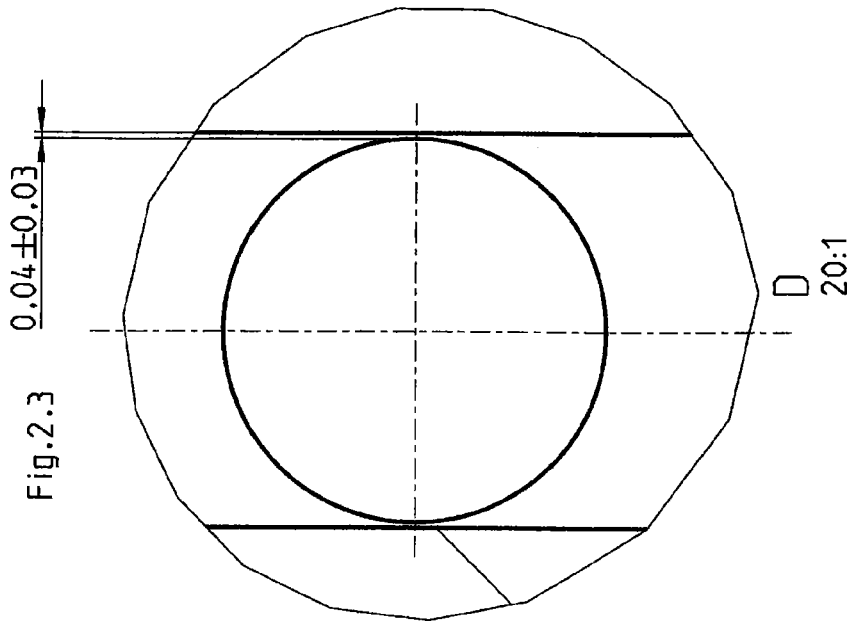
Fig.2.3 PRIOR ART

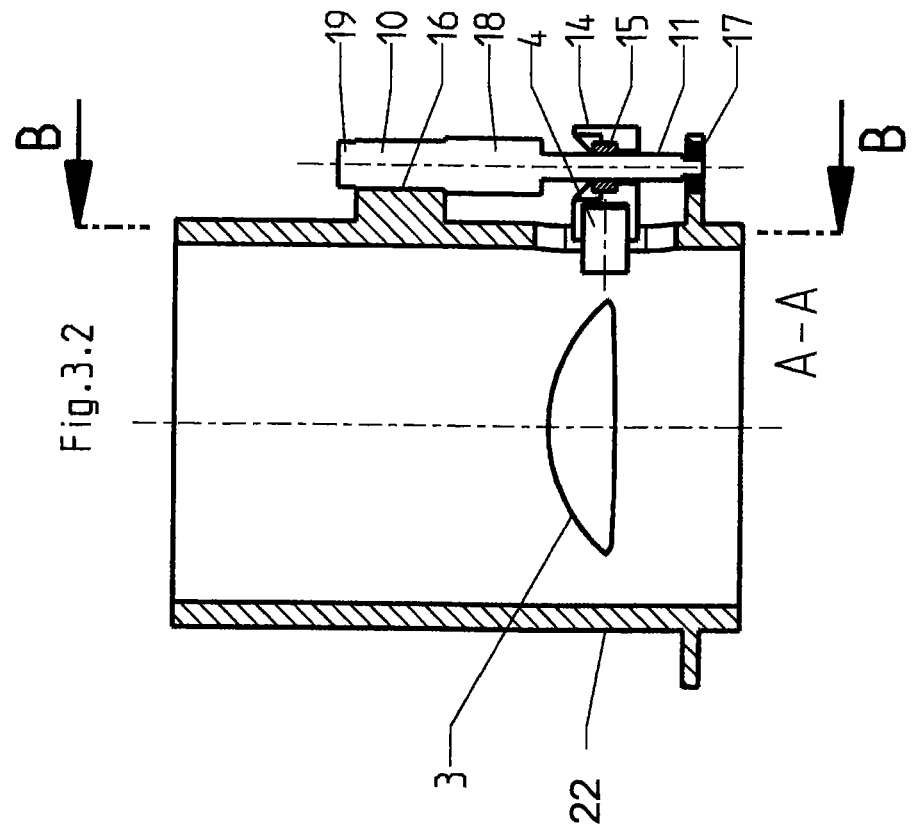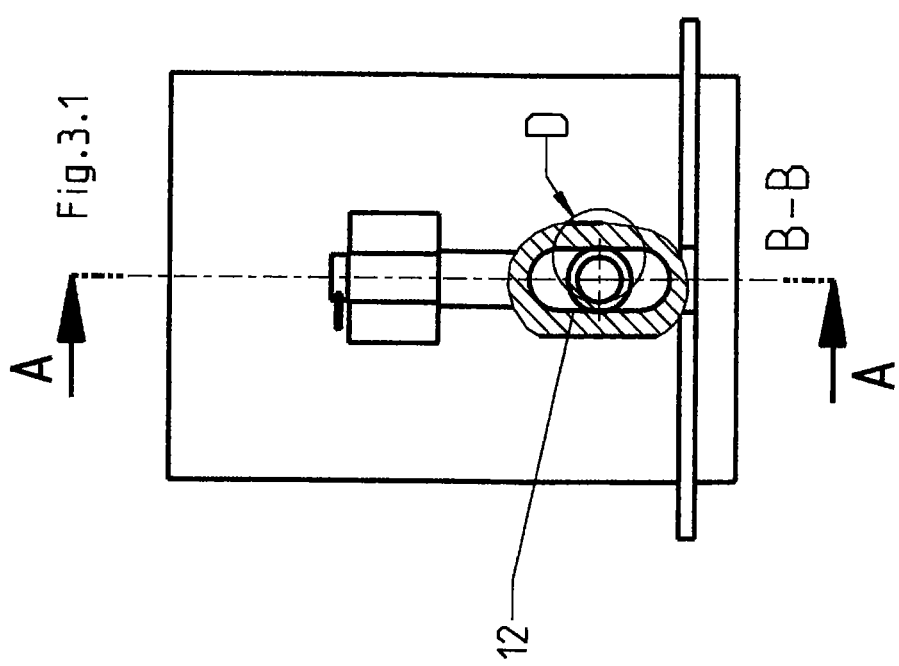

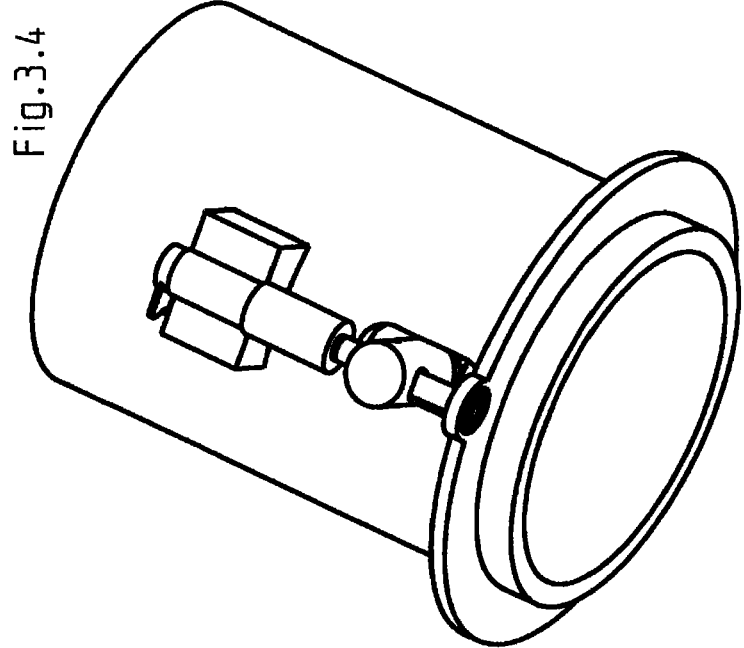
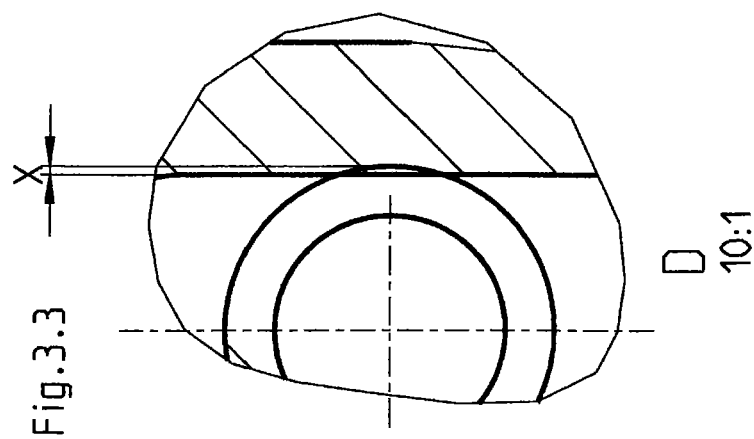

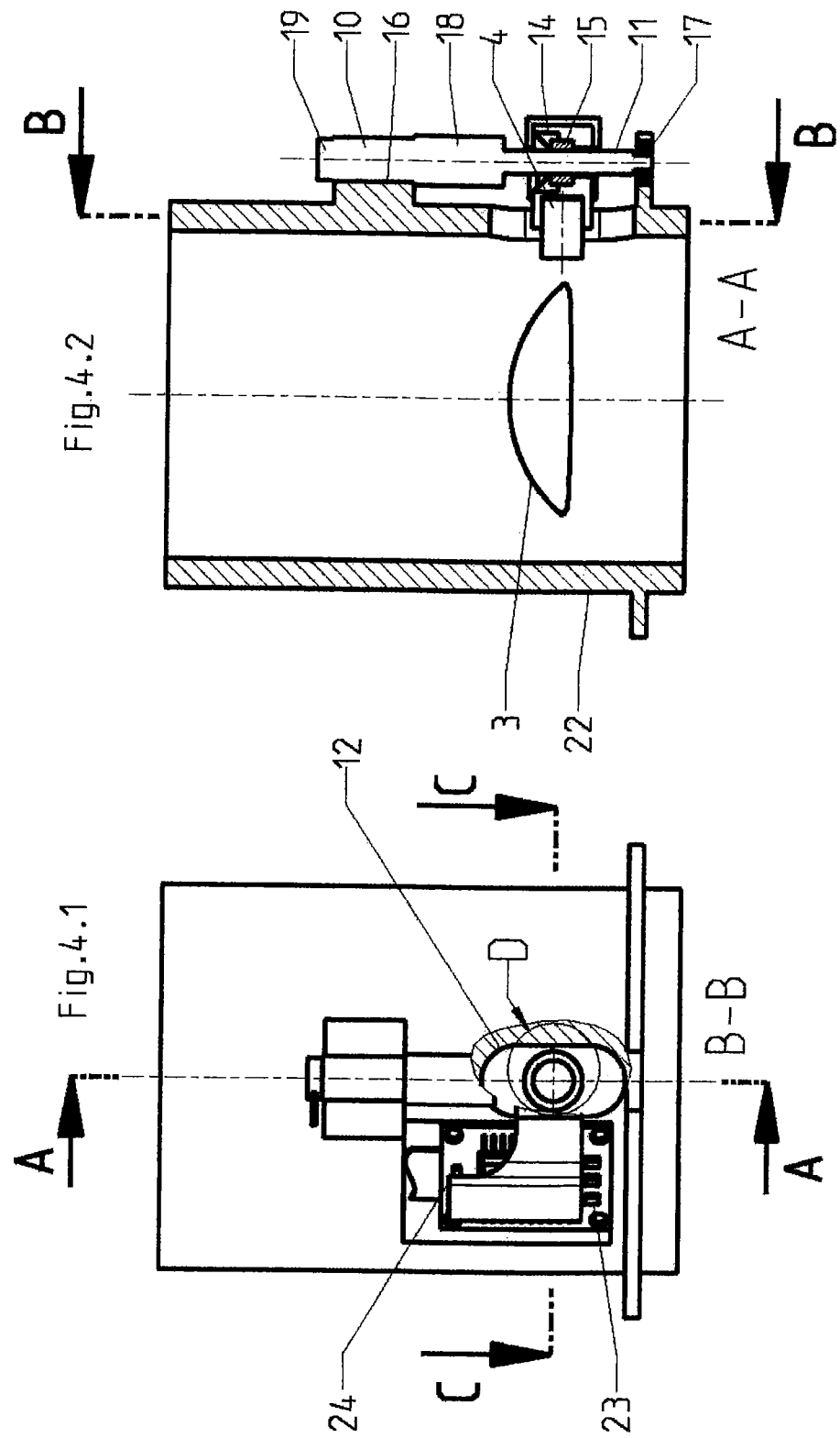

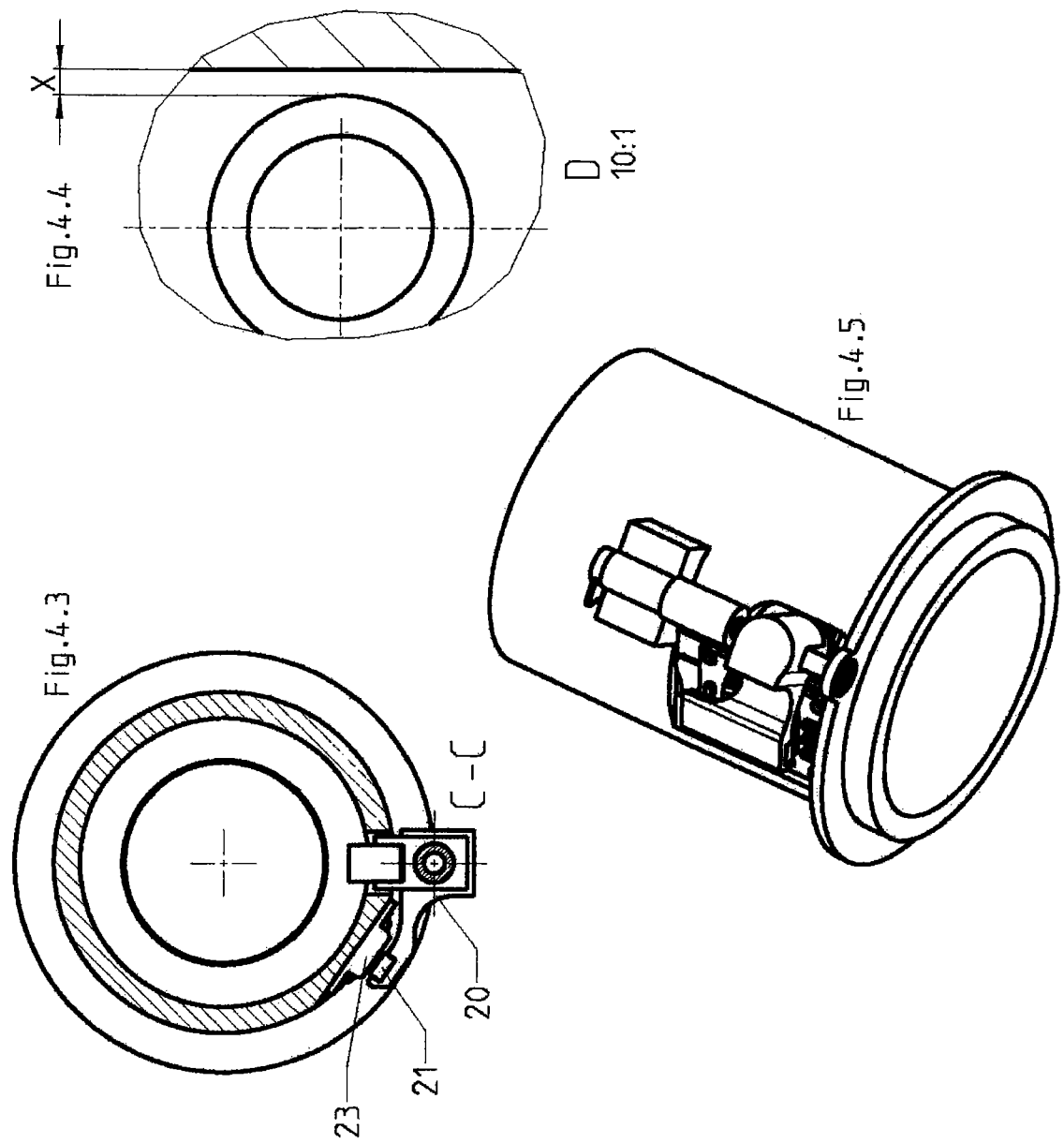

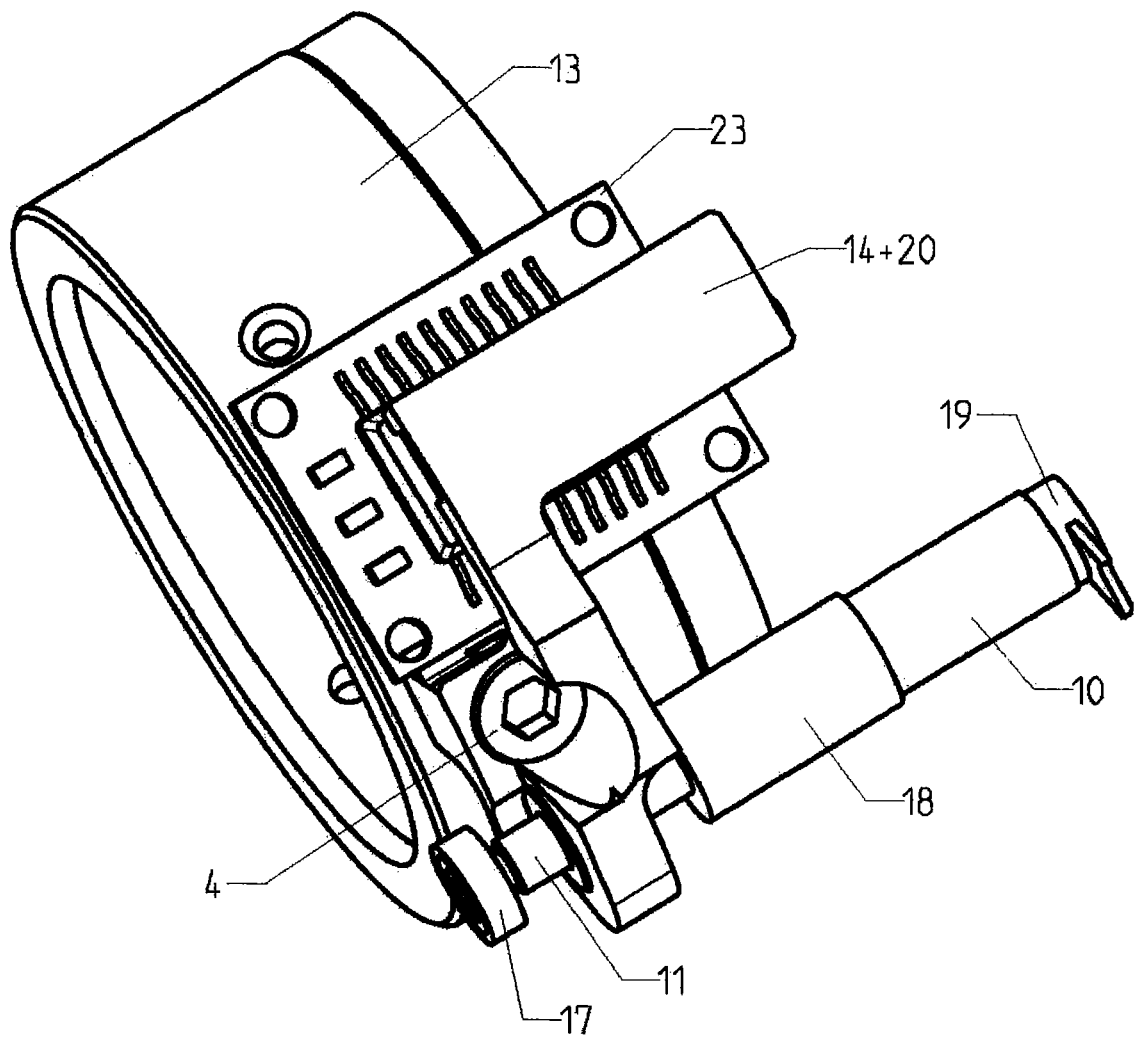
Fig.5.1

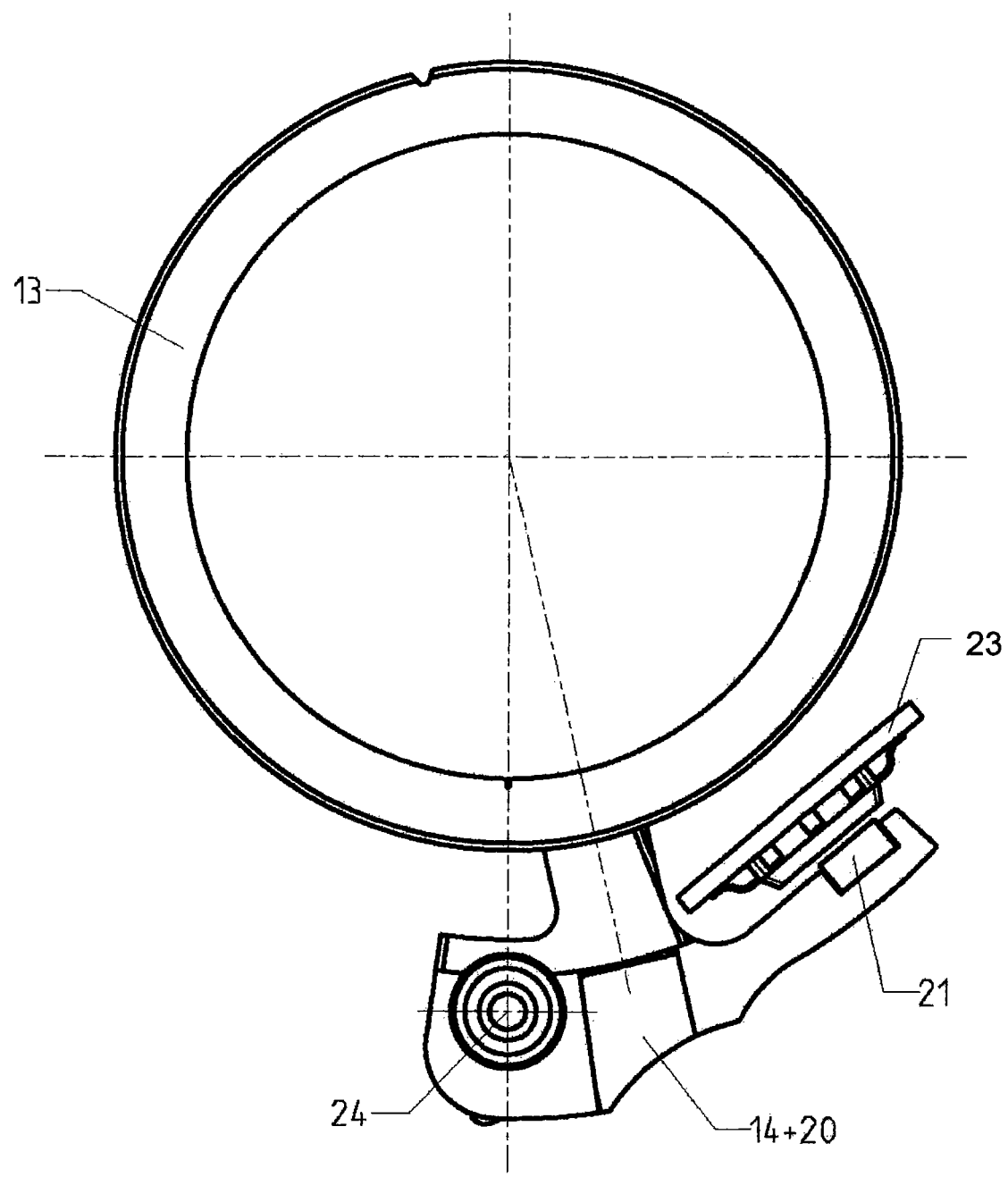
Fig.5.2

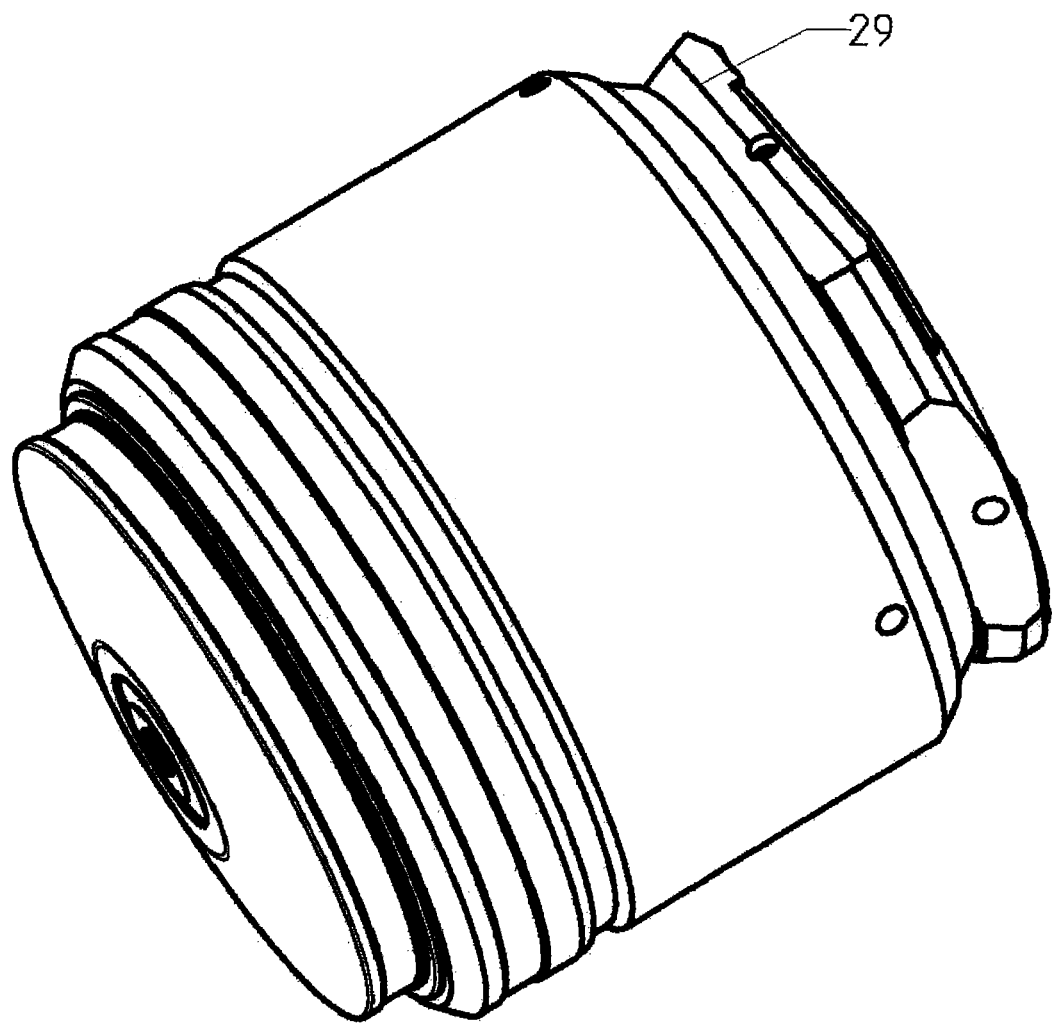
Fig.6.1

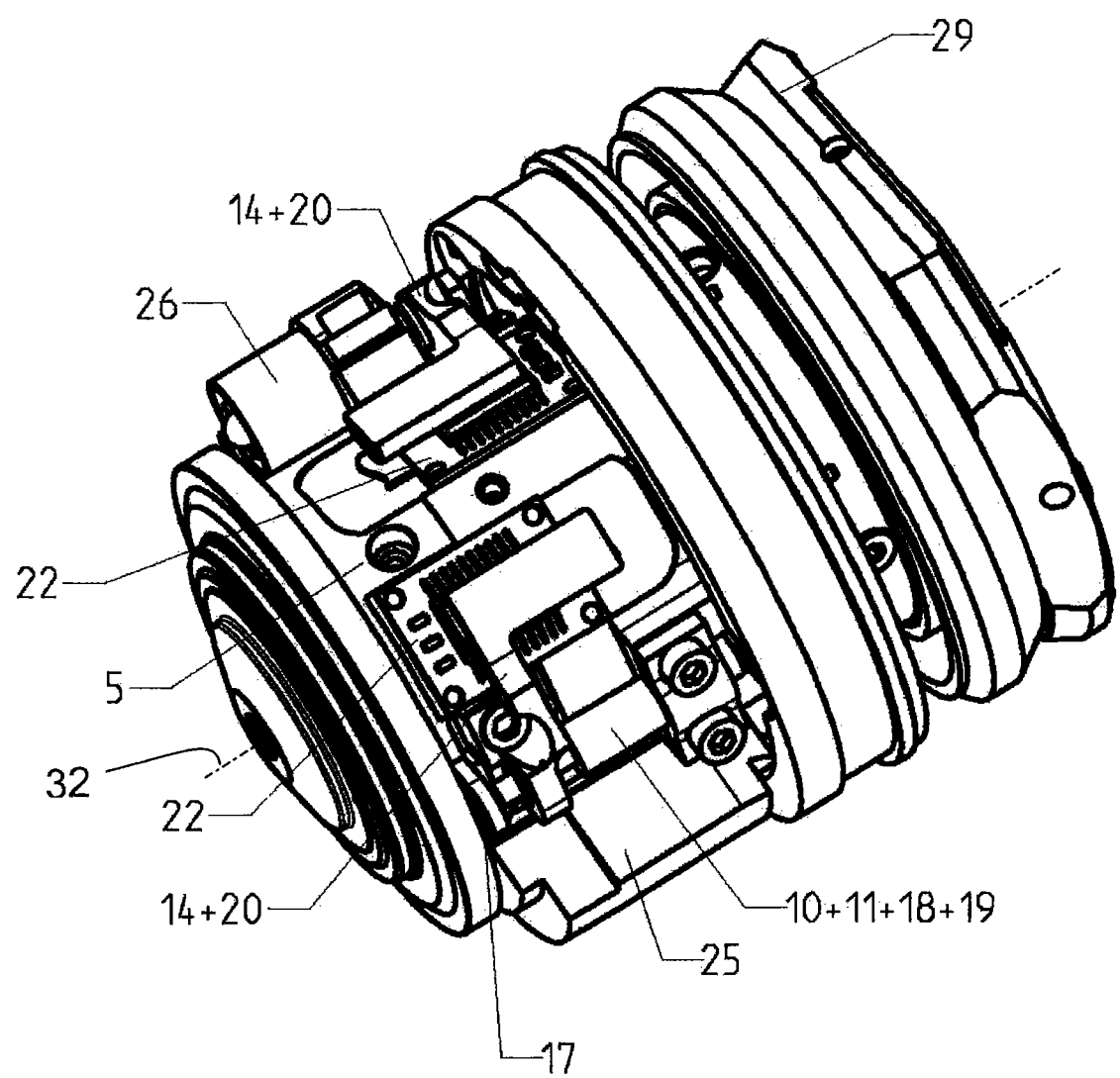
Fig.6.2

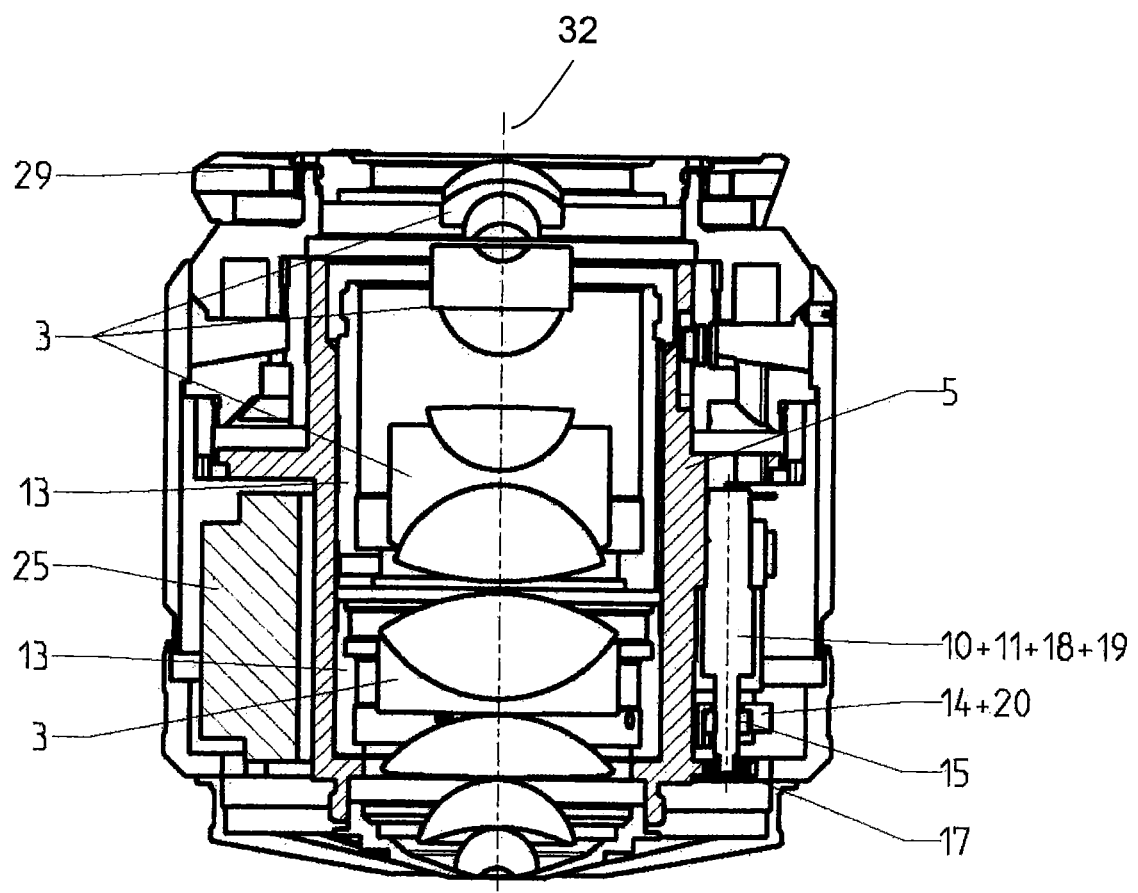
Fig.7.1

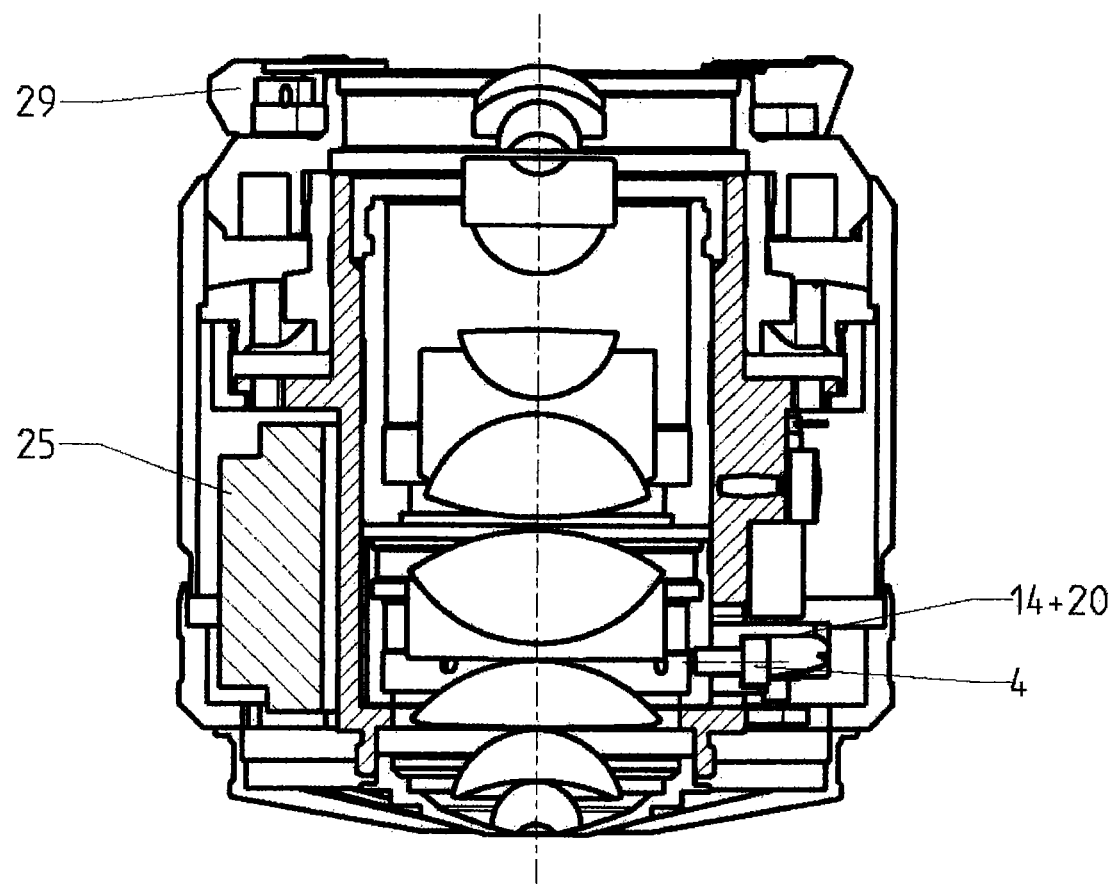
Fig.7.2

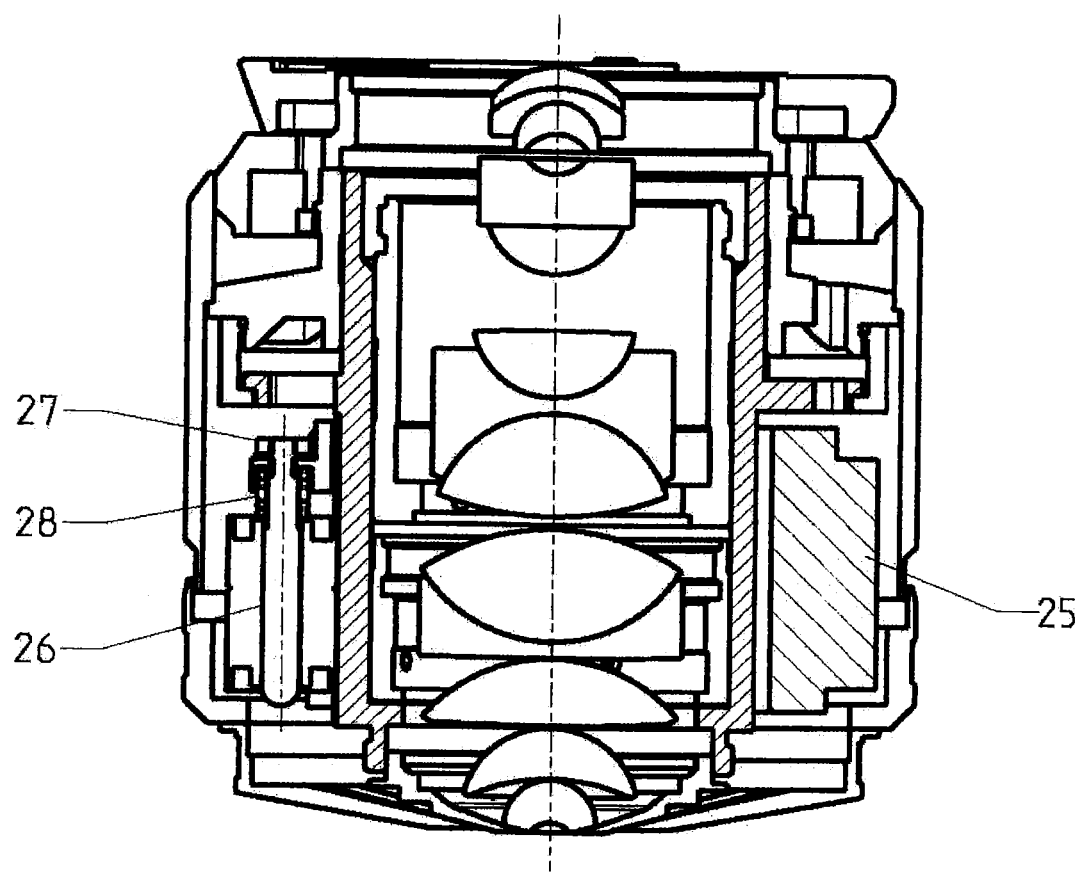
Fig.8.1

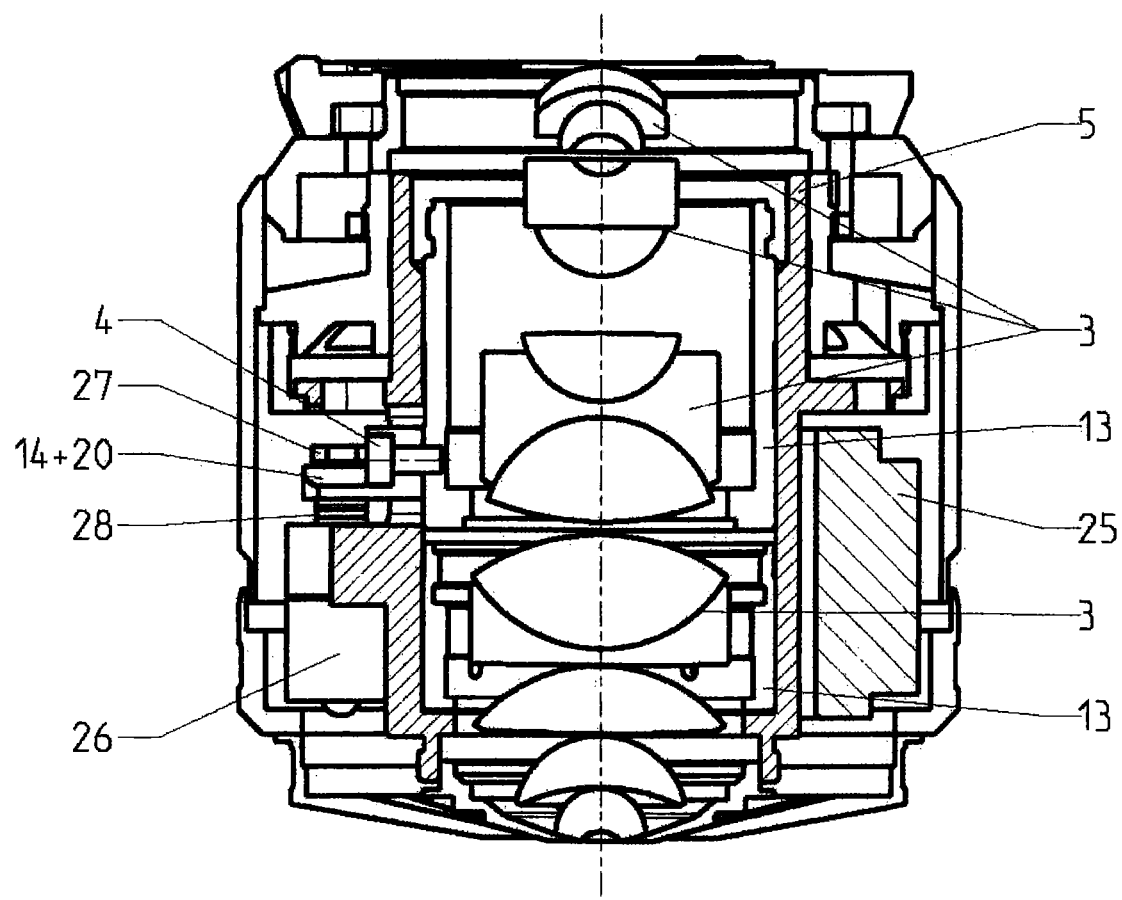
Fig.8.2

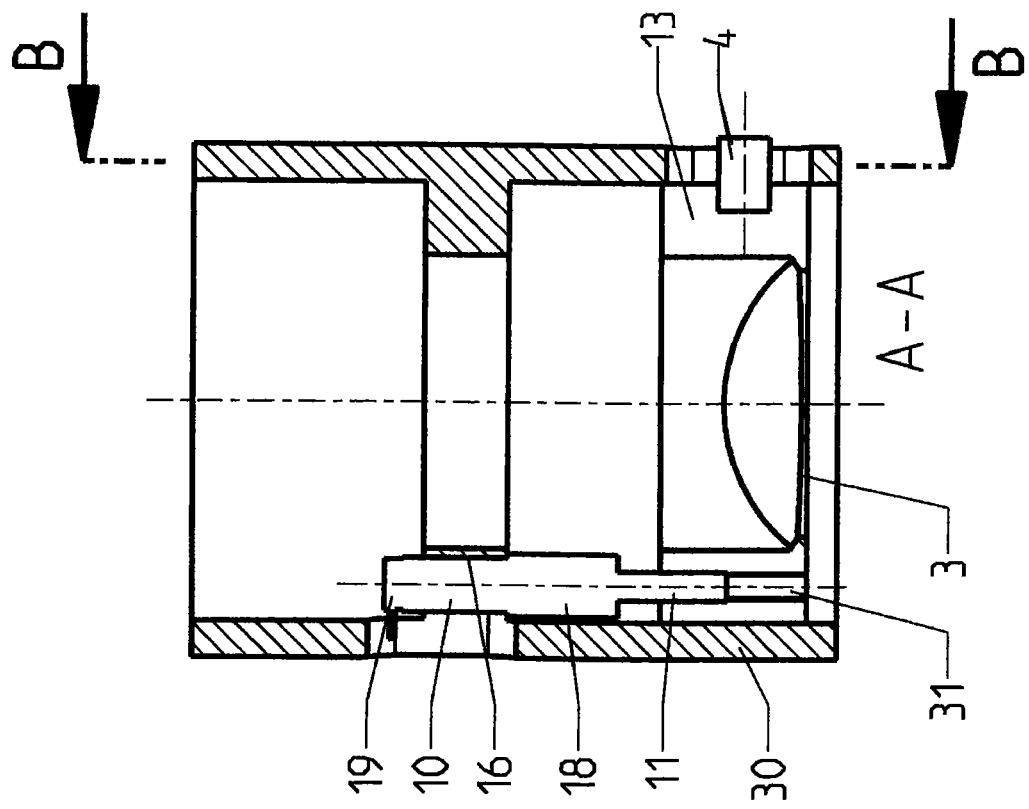
Fig. 9.2
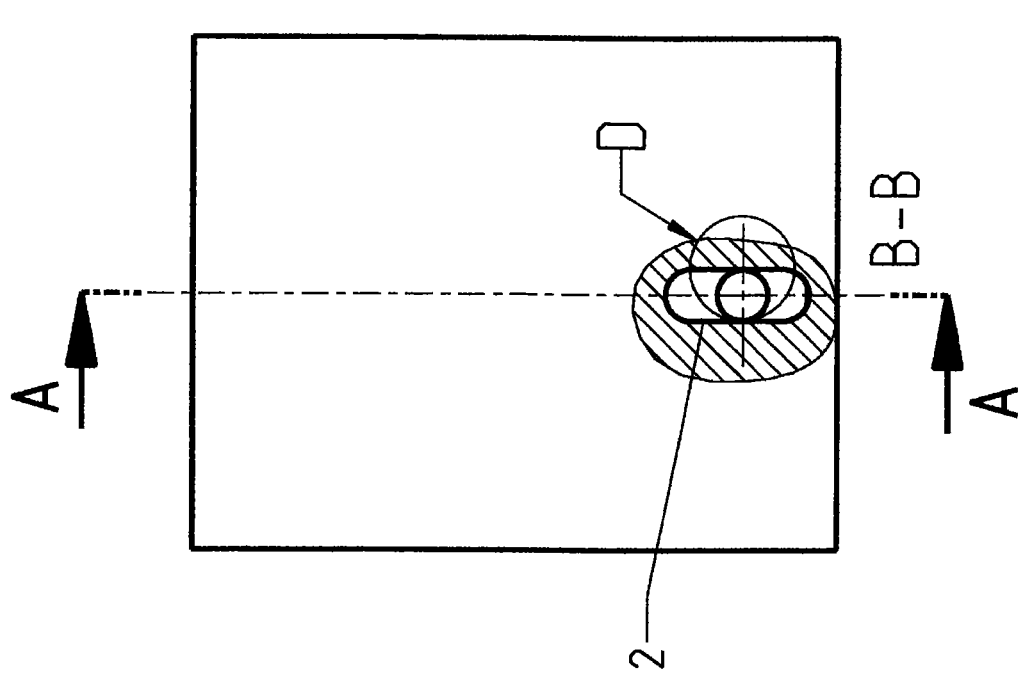
Fig. 9.1

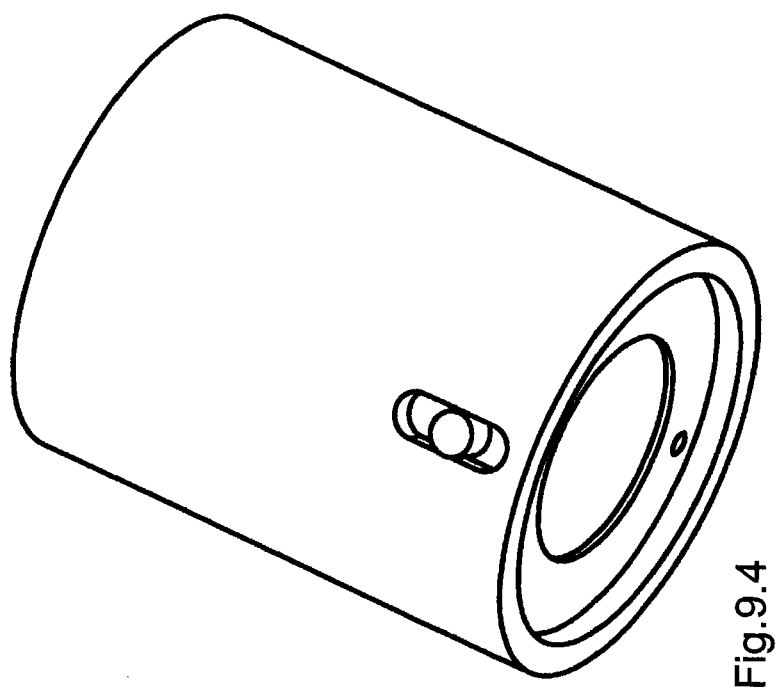
Fig.9.4
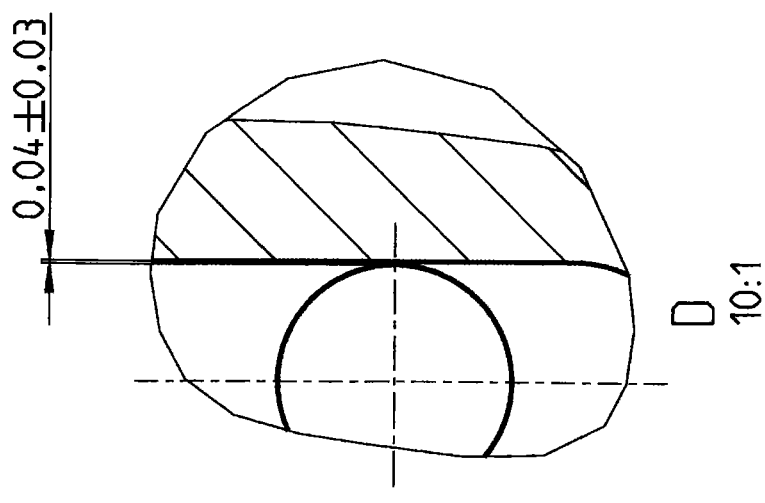
Fig.9.3
0.04±0.03
D
10:1

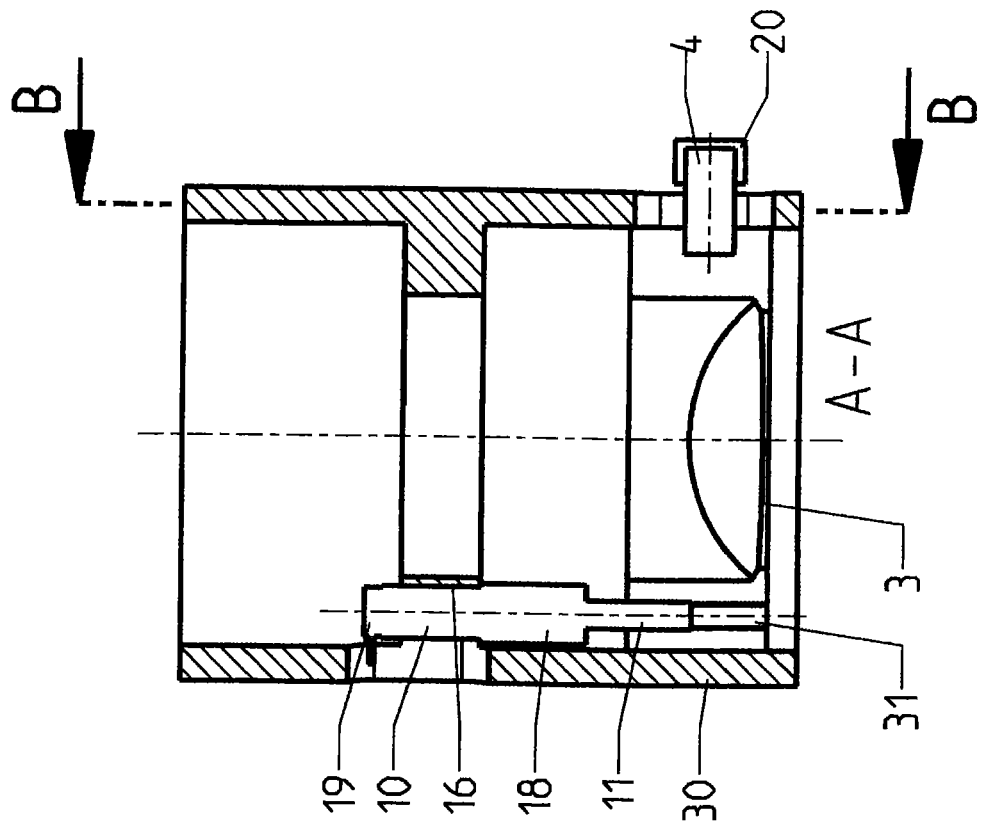
Fig.10.2
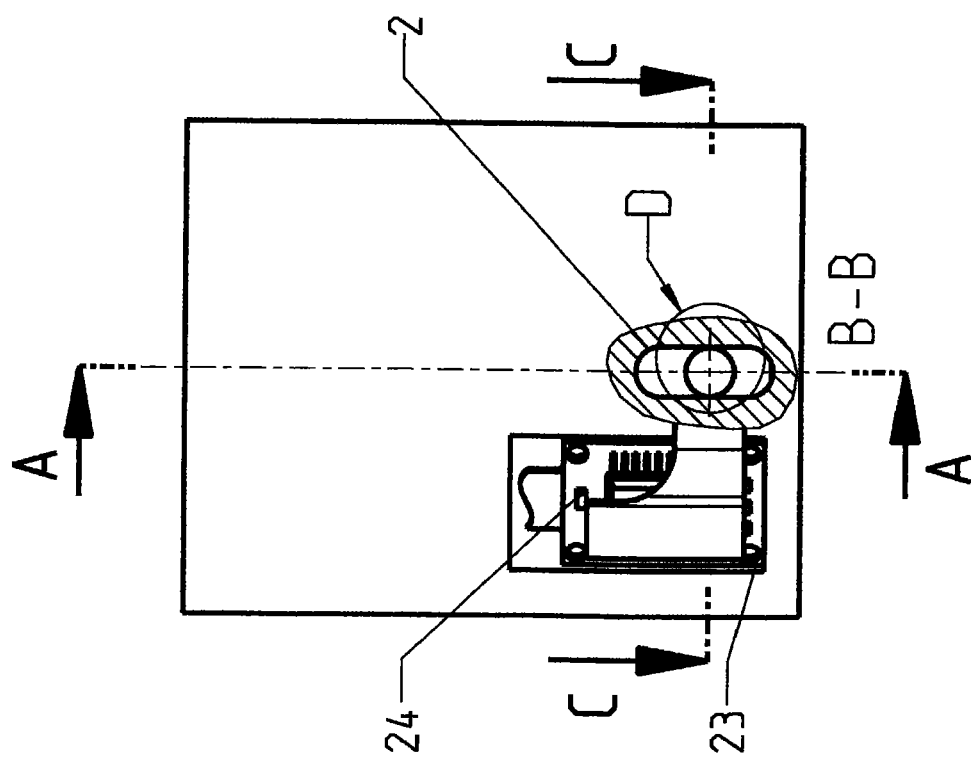
Fig.10.1

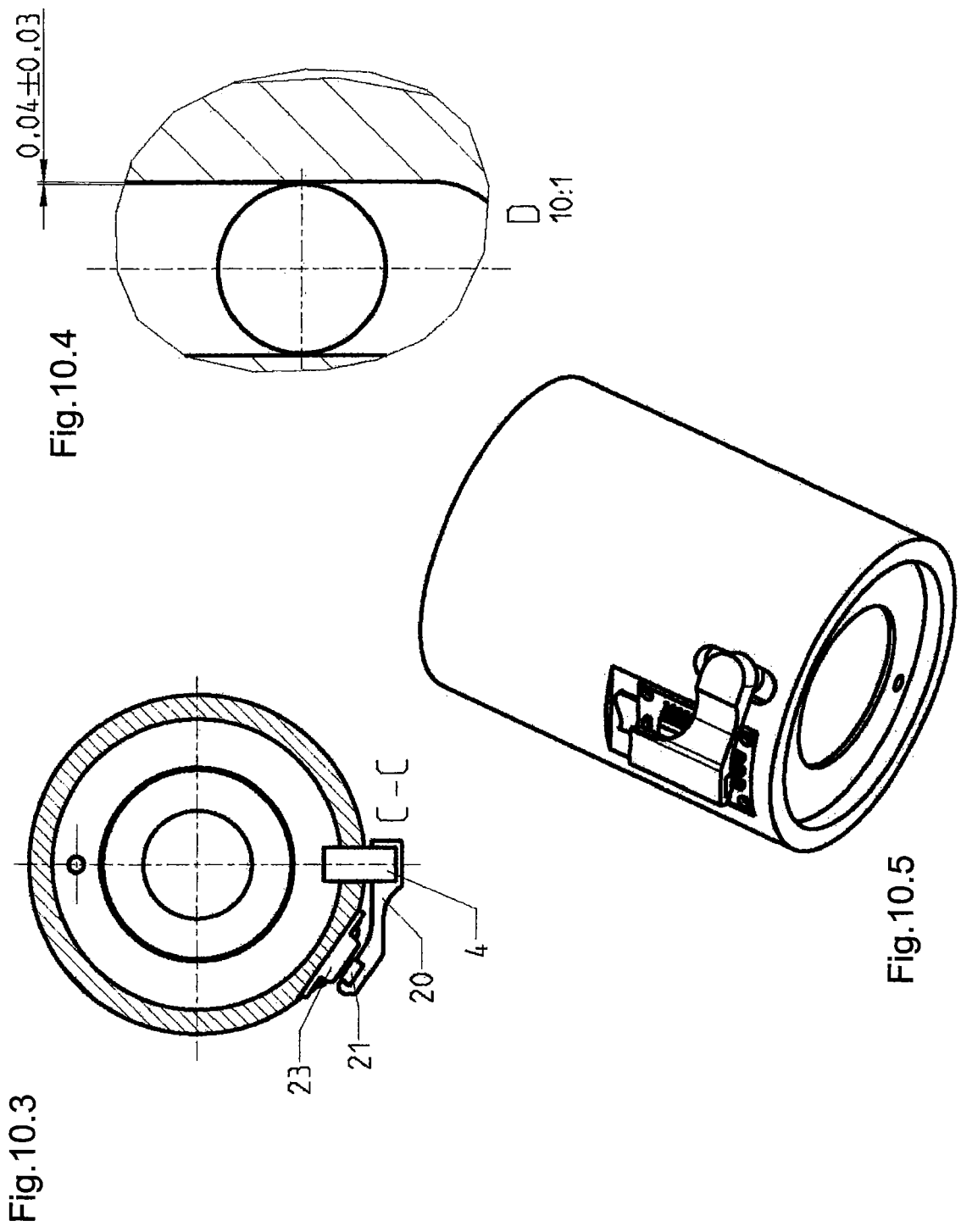

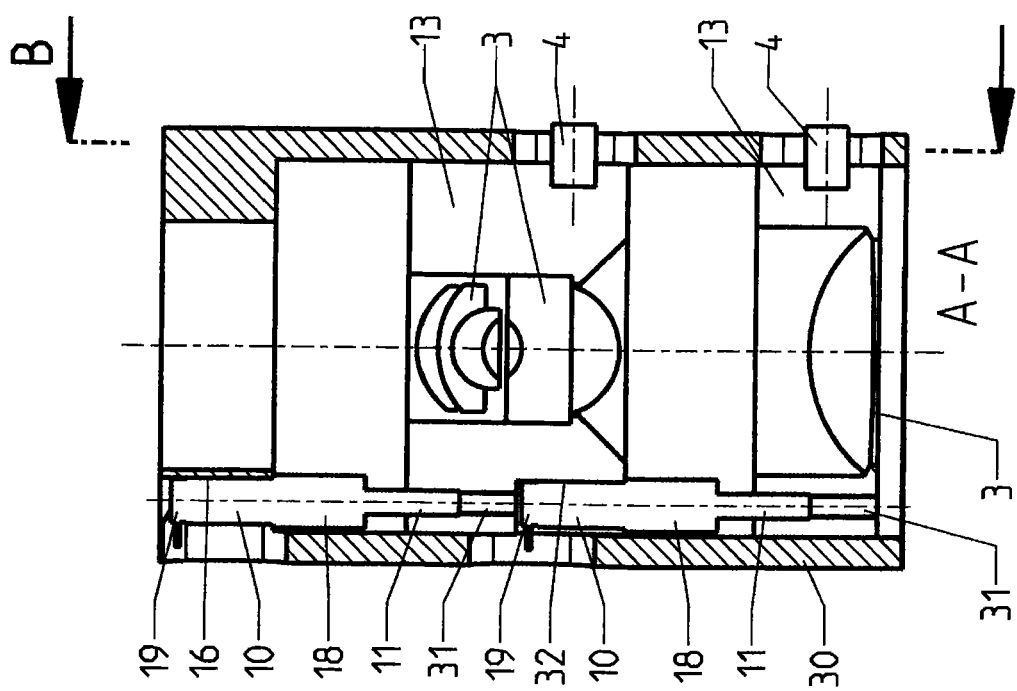
Fig. 11.2
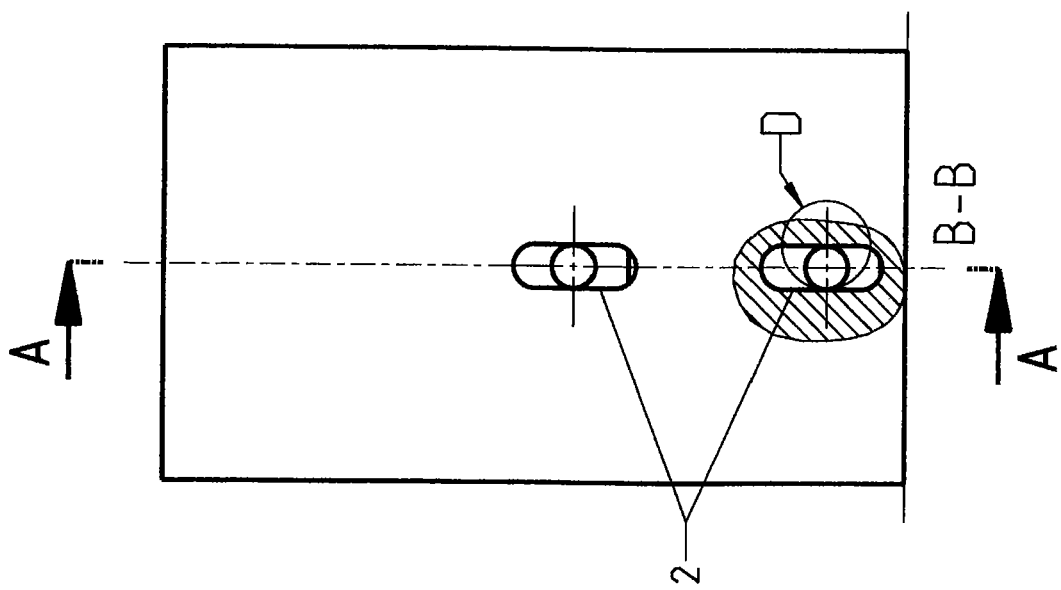
Fig. 11.1

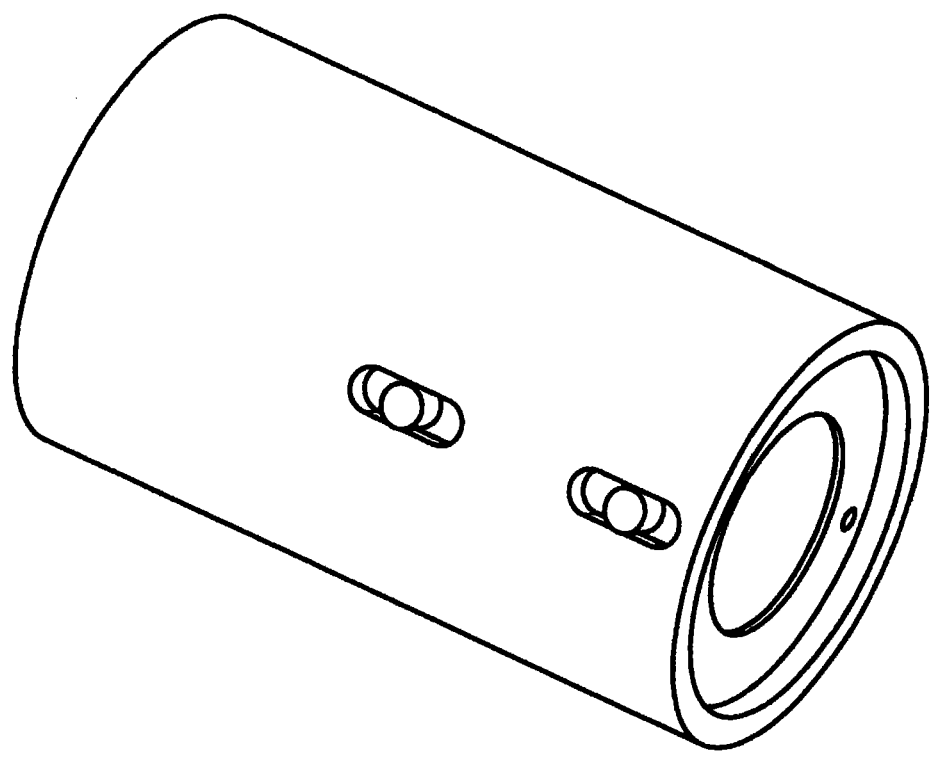
Fig.11.4
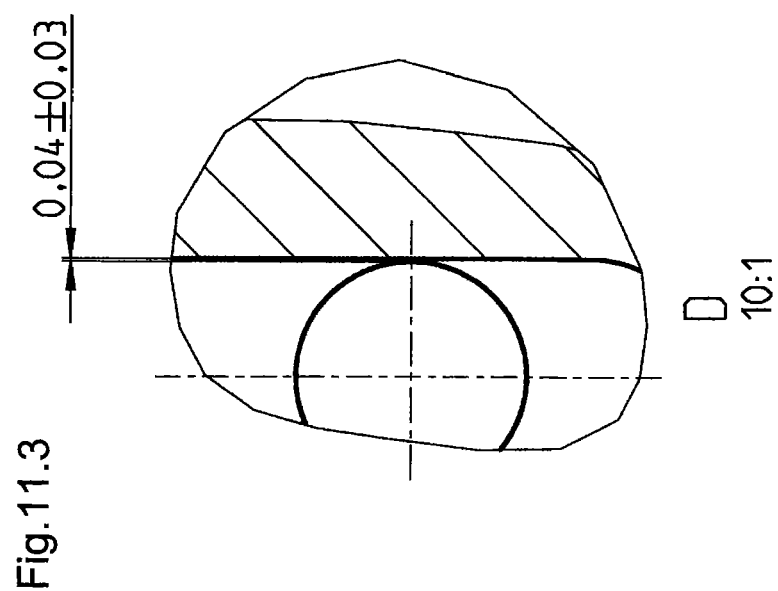
0.04±0.03
Fig.11.3
D
10:1

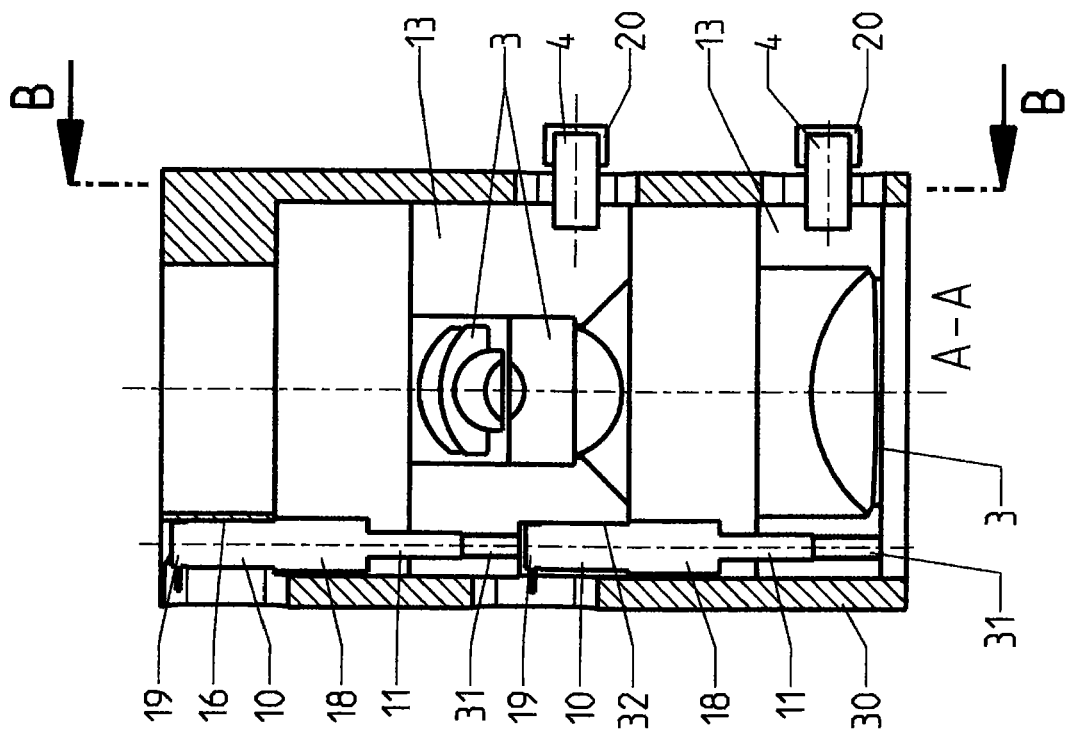
Fig.12.2
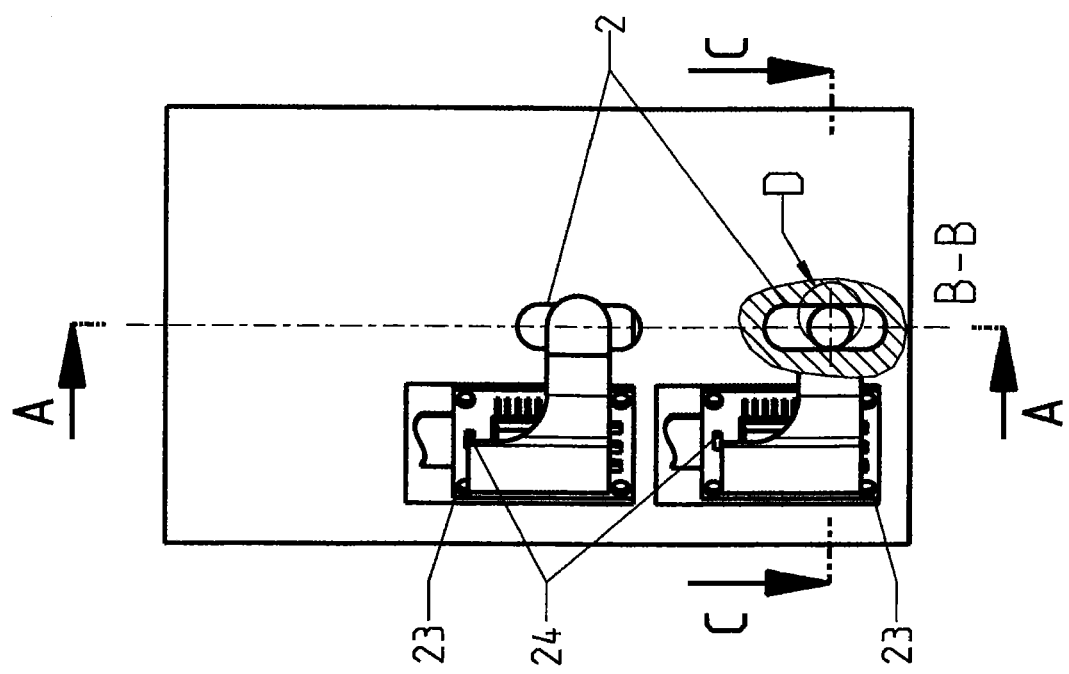
Fig.12.1

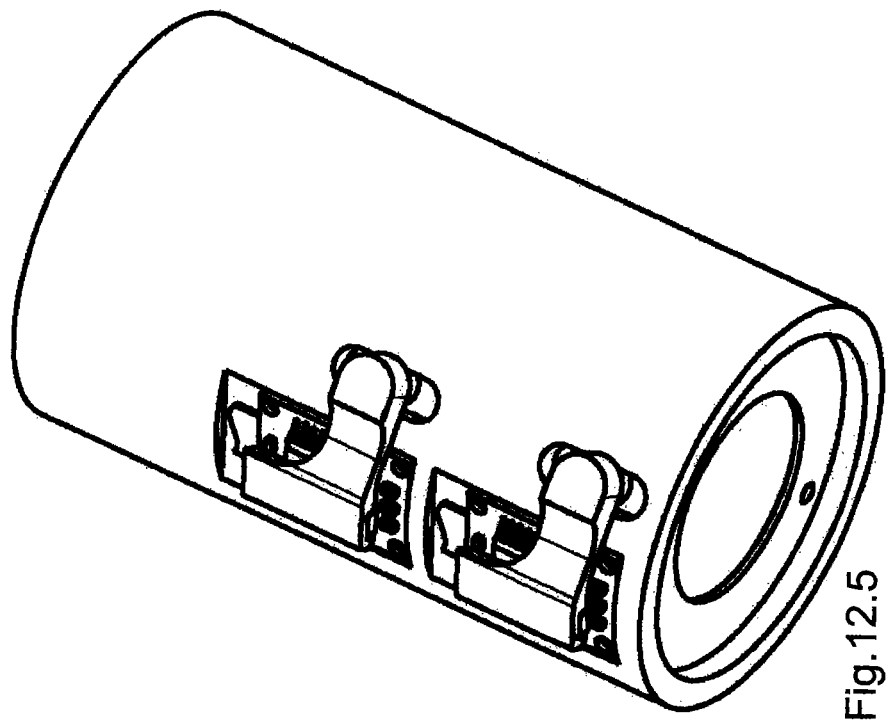
Fig.12.5
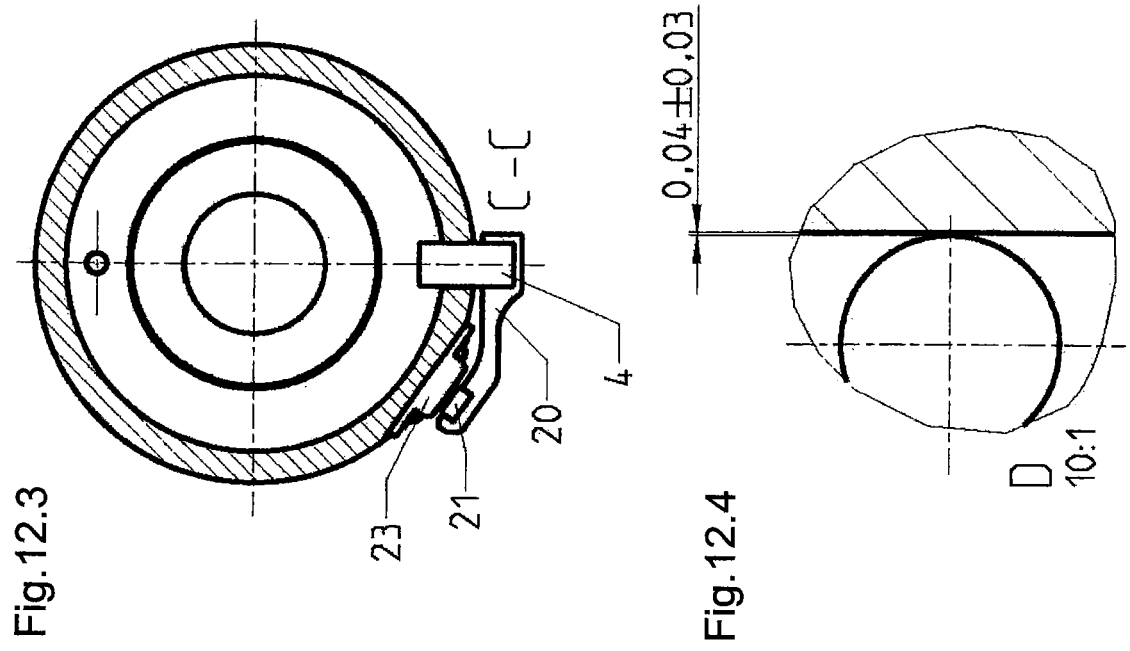
Fig.12.3
Fig.12.4

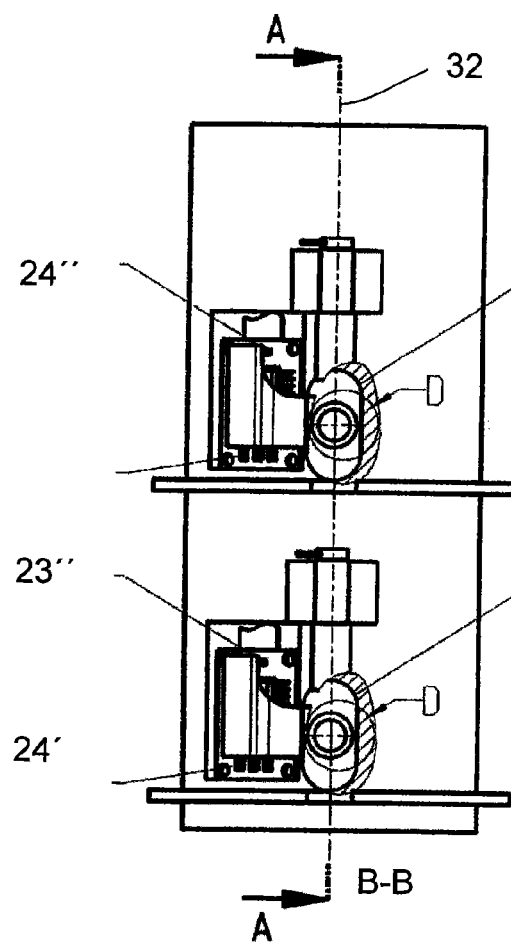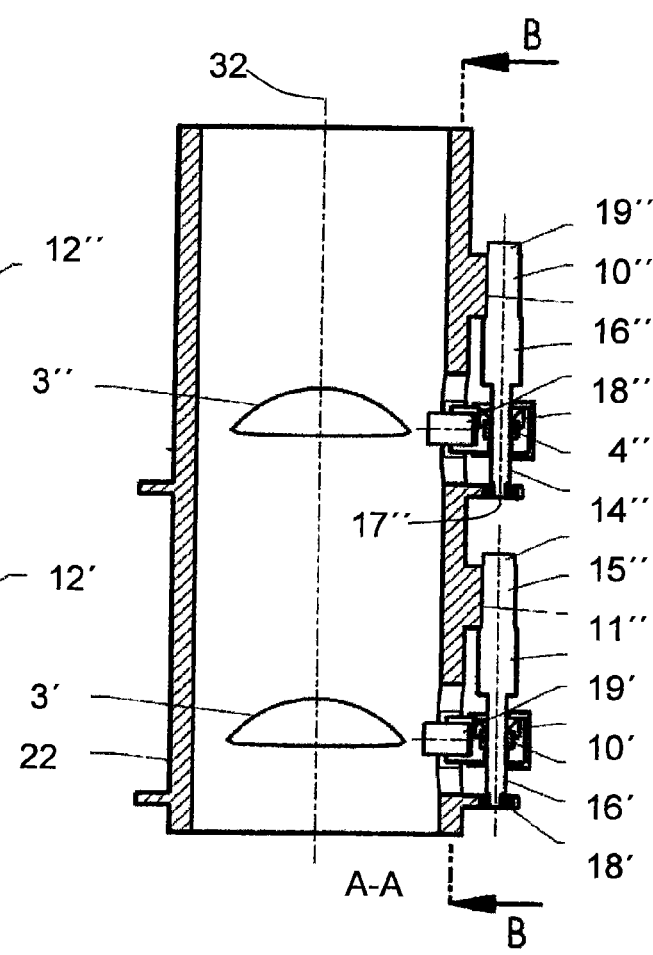
Fig. 13.1	Fig. 13.2

MICROSCOPE OBJECTIVE WITH AT LEAST ONE LENS GROUP THAT CAN BE MOVED ALONG THE OPTICAL AXIS

CROSS REFERENCE TO RELATED APPLICATIONS

This application claims priority to German National Patent Application Nos. DE10 2011 002 818.8 and DE 10 2011 117 743.8 filed 18 Jan. 2011 and 5 Nov. 2011, respectively, the entire contents of each are hereby incorporated by reference herein as if fully set forth herein.

FIELD OF THE INVENTION

The present disclosure relates to a family of microscopes, each with at least one lens group that includes at least one lens and a lens mount, such that the at least one lens group can be precisely moved along the optical axis via an electromechanical drive system.

BACKGROUND OF THE INVENTION

Microscope objectives in which lens groups can be moved along the optical axis are known per se. Moving serves, e.g., to adapt the objective to different cover slip thicknesses, different immersion liquids or different operating temperatures, or it is generally intended for the correction of imaging quality.

An example known in prior art is shown in FIGS. 1.1 through 1.5 (accordingly marked as "PRIOR ART" therein). By means of a cam 1 machined on a driving ring 6 that can be rotated about the optical axis of a lens group 3, a pin 4 is moved in axial direction. The pin 4 is mechanically firmly connected with the lens group 3. A slotted hole 2, machined into a fixed sleeve 5 that concentrically encloses the lens group, prevents the pin 4 from rotation about the optical axis while it is moved. This also secures the lens group 3 against rotation.

A lens group 3 in the sense of the invention described below is understood to be a self-contained assembly consisting of one or several optical lenses enclosed by a lens mount. For the sake of clarity, the lens mount is not shown here.

To eliminate the axial slackness between pin 4 and cam 1 shown in FIG. 1.4, frequently a spring element (not shown on the drawing) is provided within the sleeve 5. The disadvantage of this is the possible soiling of the optical system by abrasion at the contact surfaces of the spring element. Eliminating the axial slackness is important especially if, within the objective, several lens groups 3 are provided in axial succession, the distances between them are to be varied according to the principle described above. If the amounts of slackness between the pins 4 and the cams 1 differ from each other, the lens groups 3 will not start to move simultaneously when the direction of movement is reversed, which results in undesirable optical aberrations. Analogously this also applies to a rotation of the pins 4 and, thus, of the lens groups 3 relative to each other, which results in undesirable optical aberrations such as astigmatism or coma.

Another known possibility to move the lens group 3 is shown in FIGS. 2.1 through 2.5 (accordingly also marked as "PRIOR ART" therein). Here, instead of the driving ring 6 shown in FIG. FIG. 1.2, two mutually engaged threaded rings 7 and 8 are provided. The pin 4 is held in the inner threaded ring 7 in a drilled hole 9 rather than in a slotted hole. The axial moving of the lens group 3 is controlled by means of rotation of the outer threaded ring 8 and the thread lead. A spring element (not shown) can be attached outside the sleeve 5 to avoid soiling within the optical system due to abrasion. For the reasons already described above, here, too, the slackness between pin 4 and sleeve 5 must be very small. For the sake of clarity, the lens mount is not shown in FIGS. 2.1 through 2.5 either.

In both versions, the moving of the lens group 3 is intended to be manual. Especially in microscopes of inverted design, this is a disadvantage, because the objectives are arranged below the table, so that their accessibility is restricted. Settings necessary to the objective can be done only awkwardly, if at all.

To remedy this problem, a control device for control elements in microscope objectives, described in DE 10 2008 026 774 A1, is provided with motor drives. At least two lens groups can be moved along the optical axis of the microscope objective by means of allocated adjusting collars, each of which can be motor-driven. Transmitting the rotary movement of the motors to the adjusting collars is effected via gears; a control unit is provided in which characteristic curves for different amounts of travel of the control elements are stored and can be activated.

WO 08/100695 A2 describes the motor drive of the correction mechanism for objectives by means of motors provided on the revolving nosepiece and connected to the objectives via a tape. This solution is complex and requires a lot of space.

In a scanning microscope according to EP 1 319 968 B1, all lenses of the objective are enclosed by a common mount; they are adjusted along the optical axis in common, by means of an electromagnetic moving coil. Adjustment of individual lenses is not possible here.

As a disadvantage, the coupling of motor drives to a guideway for the lens groups, a feature already provided in high-grade microscope objectives, cannot be achieved with the technical solutions known in prior art.

The invention described below is based on the problem of eliminating the disadvantages found in prior art.

According to the invention, this problem is solved by the features specified in independent claims 1, 12, and 19. Advantageous embodiments are stated in the dependent claims 2 through 11, 13-18, and 20.

According to the invention, a microscope objective of the kind addressed hereby and described, depicted, and claimed herein includes: a motor producing a rotational drive movement, and transmission elements designed to convert the rotational movement into a translational movement, to transmit the translational movement to the lens group, and simultaneously to prevent any rotation of the lens group about the optical axis.

In a first embodiment, the rotating output shaft of the motor is joined to a screw spindle that engages with a translationally (or linearly) movable nut, with coupling elements being provided for transmitting the translational movement of the nut to the lens group. The coupling elements are guided along the optical axis in a constrained manner, so as to prevent their rotation and, thus, the rotation of the lens group, about the optical axis.

In a second embodiment, the rotating output shaft of the motor is also joined to a screw spindle, which in this case, however, is engaged with a threaded hole provided in the lens mount, so that—without any interposed coupling elements— the lens group is translationally moved in a direct manner. Because of the direct engagement of the screw spindle with the lens mount, both the translational movement of the lens group and the latter's securing against rotation about the optical axis are achieved.

In connection with the second embodiment, the lens group may be provided with supplementary elements for its constrained guidance along the optical axis, so that it is specially secured against rotation about the optical axis.

In both embodiments, the axis of rotation of the drive motion is preferably aligned parallel to the optical axis.

In further embodiments, the motor, the transmission elements and the coupling elements (the latter at least in part) may be accommodated either in the space between the lens mount and a sleeve enclosing the lens mounts or outside this sleeve.

Further, it is of advantage if the movable lens group is assigned a measuring device that delivers a measured value serving as a reference for the amount of travel and thus provides the basis for a higher positioning accuracy in the moving of the lens group. For this purpose, the motor may be provided with an encoder (e.g., a rotary encoder of either the optical or mechanical variety, or the like). To avoid hysteresis, a spring element may be provided between the motor output and the nut, which eliminates the slackness between the screw spindle and the nut.

With reference to the prior art cited hereinabove, the premise of this disclosure includes, among other things, the replacement of the manually operated driving rings or ring nuts by an electromechanical drive motor that generates a rotational drive movement. The axis of rotation should be aligned parallel to the optical axis of the microscope objective. The transmitting mechanism, or components of a transmission, can include a spindle connected to the output shaft of the motor, which effects the precise linear motion in axial direction along the optical axis of the objective and, thus, simultaneously the securing of the lens group against rotation about the optical axis. Thus, the linear motion of the lens group along the optical axis of the microscope is promoted while the rotary motion of the lens group is resisted. The motor and such components of the height adjustment, height selection, or height-setting, mechanism as are essential for its function may, depending on the embodiment hereof utilized, be located either in the space between the lens mount and a sleeve enclosing the lens mount, or outside this sleeve, or in an embodiment having more than one motor coupled to a discrete lens group a combination of both, for example.

In another embodiment, the measuring device is arranged at the sleeve of the microscope objective. The movable part of the measuring device may be linked to a driver so as to permit a compact design of the motorized microscope objective.

In a further embodiment a microscope objective is provided that includes: at least one lens group movable along an optical axis of a microscope objective, wherein said at least one lens group includes at least one optical lens coupled to a lens mount; an electromechanical rotary motor having a driven end portion; a plurality of transmission elements coupled at a proximal end to the driven end portion and configured to provide linear motion to a distal end portion of the elements, wherein the distal end portion mechanically couples to the at least one lens group; and structure coupled to the at least one lens group and configured to allow linear motion of the at least one lens group along the optical axis and to resist rotational motion of the at least one lens group relative to the optical axis. In yet a further embodiment, a microscope objective according to the foregoing further includes means for sensing an elevation of the at least one lens group relative to a reference elevation and providing an output signal related to the elevation relative to the reference elevation.

If more than one lens group are to be moved, a number of motors corresponding to the number of the lens groups, with associated setting mechanisms, e.g., in the form of the screw spindle and additional transmission elements, may be provided.

BRIEF DESCRIPTION OF THE DRAWINGS

Below, the invention will be explained in greater detail with reference to exemplary embodiments. In the accompanying drawings, which are not drawn to scale and in which similar or like elements are denoted by a common reference numeral (or with an apostrophe or quotation marks) from time to time herein.

FIGS. 1.1 through 1.5 show a first example of prior art.

FIGS. 2.1 through 2.5 show a second example of prior art.

FIGS. 3.1 through 3.4 show a first embodiment of the invention without a reference device for the amount of travel.

FIGS. 4.1 through 4.4 show a second embodiment of the invention with a reference device for the amount of travel.

FIGS. 5.1 and 5.2 show a preferably configured version of the reference device.

FIGS. 6.1 through 8.2 show examples of the compact internal design of the objective according to the invention.

FIGS. 9.1 through 12.5 show examples of objectives of compact design according to the invention, with the drives for setting the relative adjustment, or height parameter, of a lens group being arranged between the lens mount and an enclosing sleeve.

FIGS. 13.1 and 13.2 show an example of the arrangement of an embodiment having a plurality of motors.

DETAILED DESCRIPTION OF THE ILLUSTRATED EMBODIMENTS

The examples shown in FIGS. 1.1 through 2.5 have already been explained herein as representative prior art that appears to relate to the embodiments disclosed, depicted and claimed herein as appreciated by those of skill in the art.

FIG. 3.1 shows the first embodiment of the invention in an elevational side view; FIG. 3.2 is a cross-sectional view of section A-A from FIG. 3.1, and FIG. 3.4 is a perspective view of this embodiment. In contrast to the above-noted prior art, this embodiment does not have a driving ring 6 nor ring nuts 7 and 8. Instead, a motor 10 is arranged outside a sleeve 22 by means of a holder 16; coupled to the output shaft of the motor 10 is a screw spindle 11. The axis of rotation of the screw spindle 11 is identical to the axis of rotation of the output shaft of the motor 10 and aligned parallel to the optical axis (identified by a dashed line in several of the drawings and by reference numeral 32 in FIGS. 6.2, 7.1, 13.1, and 13.2) of the lens group 3. By means of a nut 15, the rotational movement of the screw spindle 11 is converted into an axial movement, which is transmitted to the lens group 3 via a driver 14 and the pin 4 already known in prior art. The sense of rotation of the motor output shaft can be reversed. With the sense of rotation one defines the direction in which the lens group 3 is moved along the optical axis. For stability reasons, the end of the screw spindle 11 that is opposite to the motor 10 is held in a rotary bearing 17 and thus secured laterally.

To permit more sensitive control of the lens group 3, a step-down gear 18 may be arranged between motor 10 and threaded, or screw spindle 11. Further, it is of advantage to attach to the motor 10 an encoder 19 in the sense of an integrated measuring system that ensures a defined positioning of the lens group 3. In this respect, the driver 14 may be provided with a lug, and the lens mount 13 may be provided with a light barrier corresponding with the lug, in order to create a reference of the amount of travel.

Here again, the pin 4 is guided in a slotted hole 12. This fulfills the task of the invention, viz. that, despite the technical and ergonomic improvements achieved by the invention, the design of the objective within sleeve 22, as known in prior art, is maintained. With this embodiment, a mainly technological difference from prior art is that the slackness allowed between pin 4 and slotted hole 12 no longer has to be minimized but may be substantially greater. Note that it is necessary for the pin 4 and all other parts reaching into the slotted hole 12 to have sufficient clearance relative to the inside wall of the slotted hole 12 so that the constrained situation shown in FIG. 3.3 is avoided.

If the microscope objective comprises several lens groups 3 arranged in succession along the optical axis, i.e. if more than only one lens group 3 are to be moved, a corresponding number of drives of the kind described may be distributed on the circumference of the lens mount. The installation directions of the drives relative to the holder 16 and the rotary bearing 17 may differ from each other. The lens mount is not shown in FIGS. 3.1 through 3.4 but those of skill in the art can readily appreciate various combinations for the location and direction of the drives.

In the second embodiment of the invention shown in FIGS. 4.1 through 4.5, the driver 14 is additionally provided with a magnetic holder 20 featuring a magnet 21. A sensor 23 is arranged below the magnet 21 and firmly attached to the sleeve 22 (e.g., in a classic instantiation of a Hall effect sensing arrangement, although other transducers can of course be implemented within the scope of this disclosure). Preferably, a measuring dot 24 for a reference travel is provided on the sensor 23 (e.g., provision for an initial reference position, elevation, or height of a lens group 3 relative to the sleeve 22). Here again, rotation of the screw spindle 11 will move the nut 15 and, with this, the driver 14, the pin 4 and the lens group 3. Here, in contrast to the first embodiment of the invention, the magnetic holder 20 with magnet 21 in addition are moved in axial direction, so that by virtue of the sensor 23 the correct position of the lens group 3 in the objective can be determined Instead of the magnet 21 with sensor 23, any other measuring device may be installed, such as, e.g., an optical measuring system with a measuring rule. Due in at least part to this feature, any backlash possibly occurring between screw spindle 11 and nut 15 when the movement is reversed will be eliminated metrologically, and thus will not cause any inaccuracy in the positioning of the lens group 3. The lens mount is not shown in FIGS. 4.1 through 4.5.

Also not shown on the drawings, it may be of advantage technologically not to attach the rotary bearing 17 on the sleeve 22 but to connect it with the motor 10 and the step-down gear 18 via a bridge structure and, thus, to use the axes of the bridge structure for aligning the axis of the rotary bearing 17 with the axes of the motor 10 and the gear 18.

In another embodiment, shown in FIG. 5.1 as a perspective view and in FIG. 5.2 as a plan view, the axis of rotation of the output shaft of the motor 10 is positioned not above the pin 4, which here is configured in the form of a screw head (compare FIG. 5.1), but opposite to the sensor 23. This makes it possible to position the motor 10 closer to the lens mount 13 and, thus, to engineer the entire microscope objective with a smaller outer diameter. In FIGS. 5.1 and 5.2, the appropriately configured setting mechanism and the lens mount 13 can be seen, whereas the sleeve, to the outer cylindrical surface of which the sensor 23 is firmly attached, is not shown. Also visible are the driver 14 and the magnetic holder 20, which here, for example, are of monolithic design.

FIGS. 6.1 through 8.2 are various views of embodiments in which, instead of a direct-current motor with transmission and encoder, a piezo motor 26 with spindle and a control circuitry 25 are provided. To prevent the spindle from wobbling, a counter-bearing in the form of a ball-and-socket bearing is provided (cf. FIG. 8.2), and the driver 14 with magnetic holder 20 is pressed against the counter-bearing by a spring element 28 (cf. FIGS. 8.1 and 8.2). FIG. 6.2 shows the compact design, possible thanks to the inventive idea, of the objective, and FIG. 6.1 is a perspective outside view of the same. Apart from the advantage of the compact design, these embodiment versions make it possible to employ a motor of higher power with a greater outer diameter.

FIG. 6.2 further shows an arrangement of the two motors 10 and 26 on the sleeve 22, in which the motors 10 and 26 are arranged side by side approximately at the same height along the optical axis 32. In the embodiment shown, the motor 26 is a piezo motor. Without any restriction, though, a narrow spindle motor can be employed here as well. Because of this arrangement, two motors can even be used in objectives of short overall length.

An example of the compact inner design of the objective according to the invention, configured according to FIGS. 5.1, 5.2, 6.1 and 6.2, is shown in FIG. 7.1, a sectional view illustrating the axes of rotation of the drive units. FIG. 7.2 shows the same example as a section through the axis of the pin 4.

An example of the compact inner design of the objective according to the invention, configured according to FIGS. 6.1 and 6.2, is shown in FIG. 8.1, a section through the axes of rotation of the drive units; also shown is the position of the spring element 28 provided in order to eliminate a hysteresis or reversal backlash. FIG. 8.2 shows the same example as a section through the axis of the pin 4.

In yet another embodiment version, which is not shown in the drawings, a rack-and-pinion mechanism may be provided for converting the rotation of the output shaft of a motor into the translation, with the pinion being located on the output shaft and the rack being fixed on the lens mount 13. The motor can again be connected with a transmission and an encoder. Here again, though, for the reasons already explained, one should take care to allow but little slackness between pin 4 and slotted hole 12.

It is also within the scope of the invention to place the motor 10 within the sleeve 30, as shown in the drawings starting with FIG. 9.1, so that the sleeve 30 encloses both the lens group 3 including the lens mount 13 and the drive elements. The motor 10 is fixed to the inner wall of the sleeve 30 by means of a holder 16. A separate spindle nut is not required in this case, because the lens mount 13 is provided with a threaded hole 31, which engages with the screw spindle 11. At the same time, this thread, together with the pin 4 guided in the slotted hole 2, prevents a rotation of the lens group 3 about the optical axis. Thus, there is no need also to have a separate rotary bearing 17 (cf. FIGS. 3.2 and 4.2). An advantage of this embodiment is the small number of components outside the sleeve 30, so that a compact design of the objective is possible in this way. Where required, the lens group 3 can be secured against radial rotation additionally by means of the pin 4, which is guided in a slotted hole 2 machined into the sleeve 30.

Here again, as already explained in connection with FIGS. 4.1 through 4.5 and again shown in FIGS. 10.1 and 10.2, a measuring system may be provided, which ensures the accuracy of positioning of the lens group 3 when shifted.

FIGS. 11.1 through 11.4 illustrate an extension by a second motor-driven lens group 3, with a first motor 10 being fixed to the sleeve 30 as before, whereas a second motor 10 may be fixed to the first lens mount 13. As already described in connection with FIG. 9.2, both lens mounts 13 are provided with a threaded hole 31 each, these holes engaging with the screw spindles 11.

The extended embodiment shown in FIGS. 11.1 through 11.4 can also be provided with measuring systems to ensure the accuracy of positioning of the lens groups 3 when shifted, as shown in FIGS. 12.1 through 12.5.

The drawings show only one possible design, whereas the scope of the invention furthermore comprises the variable arrangement of the motors 10 and of the control mechanisms assigned to them, especially with regard to their positions on the circumference of the sleeve.

For example, FIGS. 13.1 and 13.2 show an arrangement of two motors 10' and 10" on the circumference of the sleeve 22, in which the motors 10' and 10" are arranged one above the other along the optical axis 32; here, the individual elements, analogously to FIGS. 4.1 and 4.2, are marked . . . ' for motor 10' and . . . " for motor 10". In that way, the outer contour of the microscope objective can be made more compact. With the motors arranged like this, the microscope objective has only one projection jutting out, compared to the version described in connection with FIG. 6.2, so that it is easier to arrange in multiple-objective nosepieces without touching the outer contours of the other objectives.

Now, if the solutions according to the invention are combined with the control system known from publication DE 10 2008 026 774 A1, a microscope objective results that can be adjusted for best optical correction from a remote location. Manual adjustment is not required, so that the disadvantages involved therewith are avoided.

If the objective is connected with external power sources for powering the drives, or with external components for data exchange, cables may interfere, e.g., with the turning of an objective nosepiece. To avoid this, it is of advantage to provide the objective with a slide-in element 29 designed, say, as part of a bayonet coupling (cf. FIGS. 7.1 and 7.2). Both the data and the power currents flowing between the objective and the microscope can be conducted through this slide-in element 29 without any interfering cables.

Furthermore it is of advantage to synchronize the movement of a specimen stage with the corrective movement of the lens groups of the objective and to make allowance therefore in the overall control system of the microscope, so that the working distance between the objective and the sample can be varied automatically if necessary to ensure that a specimen observed is always imaged with high quality.

What is claimed is:

1. A microscope having an objective, the objective comprising:
   at least one lens group that is movable along an optical axis of the microscope objective and including at least one lens and a lens mount that is connected to an electromechanical drive;
   a motor generating a rotational drive movement operatively coupled to a plurality of transmission elements that are cooperatively configured to convert the rotational drive movement into a linear translational movement and to transmit the linear translational movement to the lens group and a step down gear operably interposed between the motor and a screw spindle that is operably coupled to the lens group; and
   means preventing rotation of the lens group about the optical axis coupled to the lens group.

2. A microscope as claimed in claim 1, in which a rotating output shaft mechanically coupled to the motor is connected with the means preventing rotation and said means further comprises:
   a screw spindle;
   a translationally movable nut; and
   a plurality of coupling elements,
   wherein the screw spindle engages with the translationally movable nut and the plurality of coupling elements are provided for transmitting the translational movement and for resisting rotation of the lens group, with the coupling elements being guided along the optical axis in a constrained manner.

3. A microscope as claimed in claim 1, in which a rotating output shaft mechanically coupled to the motor is connected with a screw spindle that engages with a threaded hole machined into the lens mount, to promote the translational movement of the lens group and resist rotation of the lens group.

4. A microscope as claimed in claim 2, in which the lens group is connected with additional coupling elements promoting travel of the lens group along the optical axis in a constrained manner and resisting rotation about the optical axis.

5. A microscope according to claim 1, in which the axis of the rotational drive movement is aligned parallel to the optical axis.

6. A microscope according to claim 2, in which the motor, the plurality of transmission elements and at least a portion of the plurality of the coupling elements are positioned one of:
   in a space formed between the lens mount and a sleeve enclosing the lens mounts, and outside the sleeve.

7. A microscope according to claim 1 further comprising:
   a measuring device coupled to the lens group,
   wherein the measuring device provides a measured value directly related to the amount of travel of lens group.

8. A microscope as claimed in claim 1, in which the motor is fixed on a sleeve, which is fixed and concentrically encloses at least one lens group.

9. A microscope as claimed in claim 7, in which a movable part of the measuring device is connected to at least one of: a driver structure and a sleeve that concentrically surrounds at least the lens group, wherein said driver couples to at least a part of a position-indicating sensor arrangement.

10. A microscope as claimed in claim 1, in which at least two motors are provided that mechanically couple to and are arranged on the circumference of a sleeve, side by side and at about the same height with reference to the optical axis.

11. A microscope as claimed in claim 1, in which at least two motors are provided that mechanically couple to and are arranged on the circumference of a sleeve and one above the other with reference to the optical axis.

12. A microscope comprising a microscope objective, the microscope objective comprising:
   at least one lens group movable along an optical axis of the microscope objective and including at least one lens and a lens mount and is connected to an electromechanical drive;
   an electromechanical rotary motor having a driven end portion;
   a plurality of transmission elements coupled at a proximal end to the driven end portion and configured to provide linear motion to a distal end portion of the elements, wherein the distal end portion mechanically couples to the at least one lens group;
   structure coupled to the at least one lens group and configured to promote linear motion of the at least one lens group along the optical axis while resisting rotational motion of the at least one lens group relative to the optical axis; and a step down gear operably interposed between the electromechanical rotary motor and a screw spindle that is operably coupled to the at least one lens group.

13. A microscope according to claim 12, further comprising a position-indicating transducer coupled to at least one of a sleeve disposed circumferentially around the lens group and the lens group and providing an output signal related to an elevational position of the lens group relative to the optical axis.

14. A microscope according to claim 13, wherein the position-indicating transducer includes a Hall effect sensing arrangement comprising at least one slug of magnetic material coupled to one of a moving and a non-moving portion of the microscope objective.

15. A microscope according to claim 13, wherein the position-indicating transducer includes one of an optical encoder and a mechanical encoder providing a position sensing signal that couple to a motor controller circuit of the electromechanical rotary motor.

16. A microscope according to claim 15, further comprising an activation switch coupled to the motor controller circuit adapted to provide a forward drive signal and a reverse drive signal to the motor controller circuit.

17. A microscope according to claim 12, wherein the at least one lens group further comprises at least a second lens group and wherein each of said at least second lens group includes:
    a distinct but corresponding motor to the electromechanical rotary motor having a driven end portion;
    a distinct but corresponding plurality of transmission elements; and
    a distinct but corresponding structure.

18. A microscope according to claim 17, wherein the at least second lens group couples to a sleeve that is circumferentially disposed around each lens group at one of:
    a common elevation relative to the optical axis, and
    a distinct and different elevation relative to the optical axis.

19. A microscope having an objective, the objective comprising:
    at least one lens group movable along an optical axis thereof wherein said at least one lens group includes at least one optical lens coupled to a lens mount;
    an electromechanical rotary motor having a driven end portion;
    a plurality of transmission elements coupled at a proximal end to the driven end portion and configured to provide linear motion to a distal end portion of the elements, wherein the distal end portion mechanically couples to the at least one lens group;
    structure coupled to the at least one lens group and configured to allow linear motion of the at least one lens group along the optical axis and to resist rotational motion of the at least one lens group relative to the optical axis; and
    a step down gear operably interposed between the electromechanical rotary motor and a screw spindle that is operably coupled to the lens group.

20. A microscope according to claim 19, further comprising means for sensing an elevation of the at least one lens group relative to a reference elevation and providing an output signal related to the elevation relative to the reference elevation.

* * * * *